US009536421B2

(12) United States Patent
Singhar et al.

(10) Patent No.: US 9,536,421 B2
(45) Date of Patent: Jan. 3, 2017

(54) INTUITIVE WAY TO POINT, ACCESS AND CONTROL APPLIANCES AND OTHER OBJECTS IN BUILDING INTERIORS

(71) Applicant: QUALCOMM Technologies International, Ltd., Cambridge (GB)

(72) Inventors: Anil Ranjan Roy Samanta Singhar, Keonjhar (IN); Raja Banerjea, San Jose, CA (US)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 0 days.

(21) Appl. No.: 14/728,380

(22) Filed: Jun. 2, 2015

(65) Prior Publication Data

US 2016/0358459 A1 Dec. 8, 2016

(51) Int. Cl.
*G08C 17/02* (2006.01)

(52) U.S. Cl.
CPC ........... *G08C 17/02* (2013.01); *G08C 2201/91* (2013.01); *G08C 2201/92* (2013.01); *G08C 2201/93* (2013.01)

(58) Field of Classification Search
CPC ............ G08C 2201/91; G08C 2201/92; G08C 2201/93; G08C 17/02
See application file for complete search history.

(56) References Cited

U.S. PATENT DOCUMENTS

2004/0121725 A1 6/2004 Matsui
2006/0152487 A1* 7/2006 Grunnet-Jepsen .... G06F 3/0346 345/158
2011/0124350 A1* 5/2011 Sukovic .................. H04W 4/02 455/456.3
2011/0254683 A1 10/2011 Soldan et al.
2013/0289751 A1* 10/2013 Mignot .................. G05B 15/02 700/90

FOREIGN PATENT DOCUMENTS

JP 2009303014 A 12/2009

OTHER PUBLICATIONS

International Search Report and Written Opinion—PCT/EP2016/059941—ISA/EPO—Sep. 29, 2016.

* cited by examiner

*Primary Examiner* — Leon Flores
(74) *Attorney, Agent, or Firm* — Procopio, Cory, Hargreaves & Savitch LLP

(57) ABSTRACT

A user equipment (UE) device pointed at an appliance to be controlled, or at an object that is to be accessed or about which information needs to retrieved, determines its position and orientation within an environment with respect to a fixed frame of reference. The appliance to be controlled is identified based on a determined position and orientation of the UE device and a known position of the appliance. The UE device controls the identified appliance by establishing a wireless communication link between the identified appliance and UE device based on a wireless technology that is compliant with both the appliance and the UE device. The UE device may control another appliance via a central control computer server to which the other appliance is interfaced, when the other appliance is not configured for wireless communication.

32 Claims, 15 Drawing Sheets

INTUITIVE WAY TO POINT, ACCESS AND CONTROL APPLIANCES AND OTHER OBJECTS IN BUILDING INTERIORS

TECHNICAL FIELD

The present disclosure is directed toward controlling appliances and accessing information about the appliances or other objects with a user equipment (UE) device in an environment and, in particular, to systems and methods associated with determining a position of the UE device and locations of the appliances or the objects within the environment, and controlling or accessing the appliances and/or accessing information about the objects by the UE device using short range wireless communication protocols and/or indoor navigation systems.

BACKGROUND

Devices, such as, conventional remote controllers, are widely used to remotely control appliances such as, televisions, Blu-ray® players, DVD players, audio home theaters or air-conditioners. Typically, the remote controllers are associated with their respective appliances, and a user controls the appliance (e.g., turning on/off, or increasing/decreasing volume), by pressing pre-defined buttons on the remote controller. Recently, users are provided with an option to control multiple appliances with a single universal remote control (URC). However, prior to carrying out an operation with the URC, the user needs to associate the URC with the appliances. For example, the user may perform the association by programming the URC with unique codes of the respective appliances. That is, the user needs to have a priori knowledge about the appliances and the controls of the remote controller, in order to operate either the URC or the conventional remote controller.

SUMMARY

An example system is configured to determine a position of a UE device within an indoor environment, and further to identify, access and control appliances located at respective positions within the indoor environment or identify and access information about various objects (e.g., products and merchandise) located within the indoor environment. Identification of a target appliance, by the UE device, includes identifying a target appliance and a position of the target appliance with respect to a pre-defined frame of reference associated with the indoor environment. Identification of the target appliance can also be achieved by identifying the angle at which the wireless signal is received or transmitted. Controlling the appliance includes establishing a communication link between the appliance and the UE device based on a wireless technology that is compliant with both the appliance and the UE device. Controlling an appliance and/or accessing information about the object may include the UE device to establish a communication link with a central computer server, which in turn, may be connected to and capable of controlling the appliances. The central computer may also have the ability to identify the objects based on their 3D location as well as the UE device location with respect to the pre-defined frame of reference in the building interior and thereafter provide more information about the objects, control presence based lighting, air conditioning etc. as may be desired by the user. Controlling an appliance can also be achieved through peer to peer communication between the UE device and the appliance. Other aspects, features, and techniques will be apparent to one skilled in the relevant art in view of the following detailed description.

BRIEF DESCRIPTION OF THE DRAWINGS

The described embodiments are best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. Included in the drawings are the following figures.

DETAILED DESCRIPTION

Figure 1:
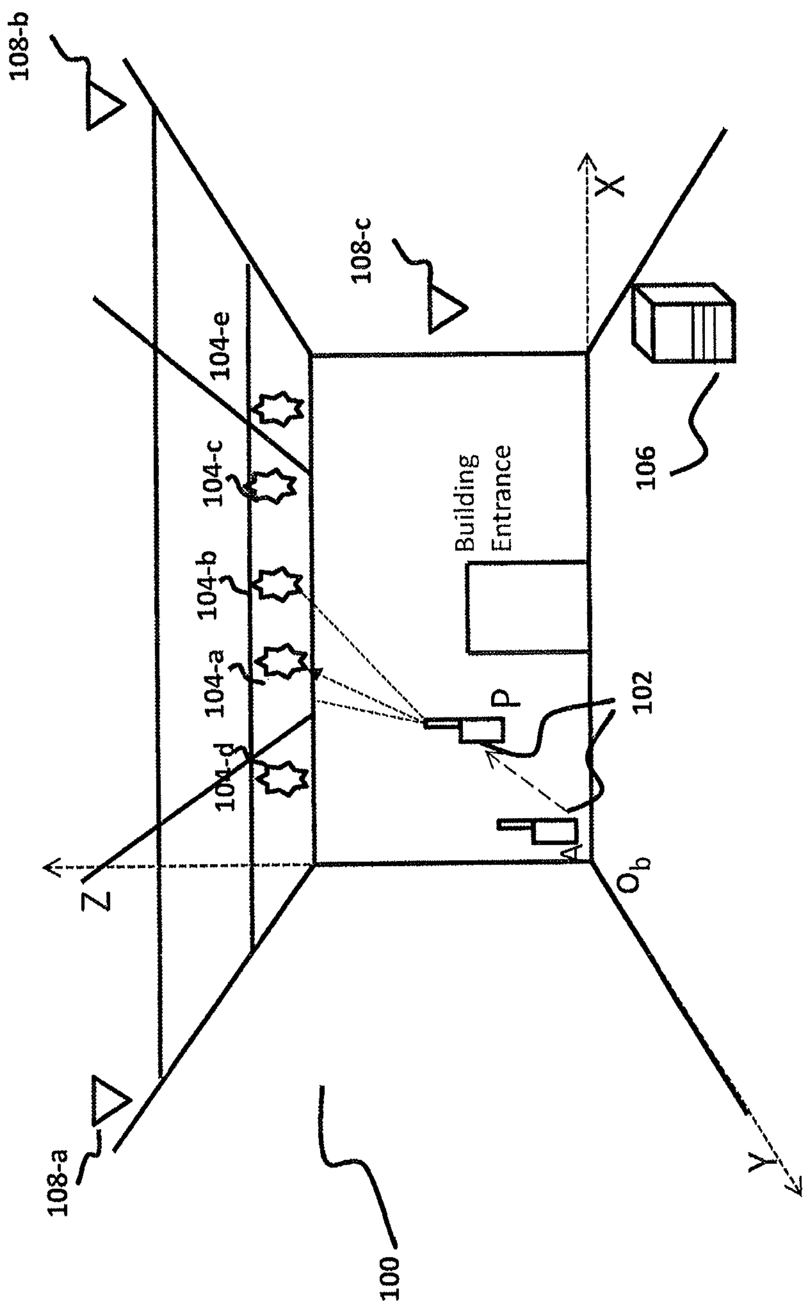
FIG. 1 is a diagram of an example indoor environment in which systems and/or methods may be implemented.

Various embodiments are described in detail with reference to the drawings, where like reference numerals represent like parts and assemblies throughout the several views. Reference to various embodiments are not limiting. Additionally, any examples set forth in this specification are not intended to be limiting and merely set forth some of the many possible embodiments.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one example," as used herein does not necessarily refer to the same embodiment, although it may. Similarly, the phrase "in some examples," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise.

At a very top level, embodiments described herein, relate to identification of an appliance or fixture or an object (e.g., a product or a merchandise) by pointing at the appliance or object with a UE device in an indoor space. In one example, the pointing may include pointing a hand of a user towards the appliance while the user has a wearable UE device (that includes a communication technology, e.g., Bluetooth® Low Energy (BLE)) strapped on the wrist. In another example, pointing may include pointing and orienting the UE device, such as a mobile device, towards the desired appliance or object. Once the appliance (e.g., a permanent fixture in the indoor space) or object, which may be equipped with wireless communication technology such as Bluetooth, is uniquely identified, a Bluetooth address or any such connectable identification or connectivity information of the appliance, may be determined by the UE device. For example, determination may include looking up a database of records, that may be stored either in the UE device or downloaded from a central computer server, and includes physical coordinates of the appliances or objects. The physical coordinates, may be set with respect to a predefined frame of reference that is associated with the indoor space. The UE device may correlate the physical coordinates of various appliances or objects in the indoor space with their connectable identification information. Based on the results of the correlation, the UE device may then select the desired appliance, and establish a radio connection (e.g., a Bluetooth link) to carry out desired operations of the selected appliance or to obtain information about the object.

It is noted that, however, in some situations, in order to obtain information about objects (e.g., products or commodities) that are placed at different locations in a building interior (e.g., inside a store of a shopping mall), the user or a potential buyer may have to seek human assistance or take additional steps such as searching about the object on the Internet®, or scan a bar code or a QR code to identify the product and access more information about the product. For example, in a museum the amount of information about an exhibit or an artifact may be limited by the display area, and a visitor has to seek human assistance or take extra steps to obtain more information. Moreover, in building interiors, automatic turning on and off of appliances such as lights or air conditioners are typically achieved using proximity sensors which require additional deployment of these sensors in the vicinity of the appliances.

As such, in certain implementations, the process of identification of the appliance or the object is performed by the central server. In these implementations, the central server initially receives the position and/or orientation information of and from the UE device. The UE device may request the central server to identify, access and/or control any appliances or objects found along its line of sight or in the vicinity. In response to the request, the central server may consult the database of records and the location information of the UE device to perform the requested operation.

To date, indoor positioning of a UE device has been achieved by employing different positioning technologies such as distance measurements to nearby anchor nodes (e.g., Wi-Fi access points at known positions inside an indoor space), dead reckoning, or magnetic positioning.

Moreover, due to improvements in indoor positioning technologies, many applications, such as navigating a shopper to a specific location (e.g., a shelf of products) within a retail store and providing advertisements about the products, upon arriving at that specific location may be implemented with a UE device.

Example systems described herein, provide a user with an intuitive way to control household or commercial appliances. For example, the user may point his or her UE device (e.g., a mobile device) or a stretched hand (with a wearable UE device, such as a smartwatch) at a target (or desired) appliance to identify the target appliance, based on the indoor location and orientation information of the UE device and 3-D coordinates of the appliance. Upon the identification, the user may accurately select the target appliance from all the nearby appliances and control (e.g. switching on and off) the target appliance by establishing a communication channel (e.g., a Bluetooth channel) with the desired appliance when it is configured to establish a wireless connection. In some implementations, an appliance may not be configured to establish a wireless connection with the UE device, but is only capable of being controlled by and from a wireless communication capable central control computer server. In such implementations, the UE device may establish a wireless link with the central control computer server, send its location coordinates and line of sight information, and ask the central server to identify and thereafter control the appliance. This may be applicable to situations where the appliances are physically small with simple On/Off controls (e.g., light fixtures in a room) and it is not cost effective to equip the appliances with individual wireless capability. That is, in such cases it may be cheaper to control such appliances using a wireless communication capable centralized control computer server. Appliances may be, for example, household electrical appliances, such as lights, fans, or an air conditioner. It is contemplated, however, that any type of electrical or electronic device, may be an appliance. It is further contemplated that, a first appliance may be associated with a second appliance, and in certain implementations, the second appliance may be controlled by the first appliance, and vice-versa. For example, a projector and a gimbal mounted laser pointer may be the first and second appliances respectively, and upon receiving instructions from the computer server, the projector may direct the laser to point at certain directions.

At a high level, the various examples disclosed herein relate to identification of an object, appliance or fixture located in an indoor environment in order to control the appliance using a UE device. In one example, an administrator may perform a setup of the indoor environment (or a building). During the setup, the administrator may define a fixed frame of reference (e.g., reference coordinate system and an origin of the reference) and associate the frame of reference with the building. In addition, the administrator may survey the installation points for various appliances, compute and assign positions (e.g., coordinate positions) to the appliances or objects in the fixed frame of reference. The resulting collection of various appliances or objects in the interior of the building, their position coordinates with respect to the pre-defined frame, identifying attributes such as Bluetooth address and various physical attributes of the appliances or objects (e.g. types of appliances or information about objects) may be compiled into a computer searchable database for the particular indoor space. Details of the indoor location are discussed with respect to FIG. 1.

A user of the UE device, in one example, upon entering the building, room or other space, may provide instructions to the UE device to determine its position and orientation with respect to the fixed frame of reference that is associated with the space. The determination may be based on communication with the various radio-frequency (RF) signal sources, such as Wi-Fi access points, Bluetooth devices, and sensors that are available to the UE device to aid in indoor navigation. In this process, the UE device may further download a three-dimensional (3-D) map of the space and a database that includes position information of the appliances in the space. In one example, the UE device may update its position and attitude while navigating through the indoor environment using known indoor navigation techniques, such as fingerprinting or dead-reckoning. Discussions related to the determination of position and orientation are provided below with respect FIGS. 2A-2B.

The fixed frame of reference associated with the space, or any other frame of reference associated with any other entities (e.g., UE device, appliances and RF signal sources) in the space, may be based on a coordinate system such as, Cartesian coordinate system, cylindrical coordinate system or spherical coordinate system. As such, the location, position and orientation information of the entities may also be based on one or a combination of the above mentioned coordinate systems.

The user of the UE device, may identify and select a desired appliance in the space as described with references to FIGS. 3A-3E, in order to control the appliance. In one example, the identification could be made by pointing the UE device at the appliance. If the UE device is a wearable device such as a watch-like device that is strapped to the user's hand, the user may point his/her hand to orient the UE device towards the desired appliance. The system may then calculate a line of sight (LoS) for the UE device with respect to the fixed frame of reference that coincides with the pointing direction. The LoS may be an imaginary line that is calculated along a directional axis (e.g., along the axis along which the UE device is being pointed) associated with the body of the UE device. The UE device may further calculate lines of association (LoAs) for all the appliances with respect to the fixed frame of reference. The LoAs are imaginary lines that may be calculated between the UE device and the respective appliances by connecting the coordinate position of the UE device and the respective appliances' coordinate positions.

In an ideal situation, when the user points the UE device at the desired appliance, the LoA associated with the desired appliance may match with the LoS of the UE device. As such, the UE device may select the desired appliance and then control the appliance. In reality, however, due to error in identification (e.g., the user may not accurately point the UE device at the desired appliance) or due to errors in sensors, the LoS may not exactly match with the LoA.

In such a scenario, the UE device may determine correspondences between the LoS and LoAs. For example, the UE device may calculate angles between the LoS and the LoAs. The UE device may further compare the calculated angles with a minimum threshold angle. If one of the calculated angles falls within the threshold angle, the UE device may identify the appliance for which the LoA subtends that one angle with the LoS. In other words, the appliance that is closest or that substantially corresponds to the LoS of the UE device is identified and selected as the target appliance. In addition, if multiple appliances meet the criterion (i.e., fall within the minimum threshold angle criterion), the UE device may provide a selection choice to the user. For example, the multiple appliances, that meet the criterion, may be displayed on a display of the UE device. The user may then choose the appliance, from the displayed appliances, that he/she wants to operate. In one example, the UE device may further compute distances between the appliances and the UE device to identify the closest appliance (e.g., when multiple appliances share the same LoA).

Reference is now made in detail to the examples illustrated in the accompanying drawings and discussed below. FIG. 1 is a perspective drawing of an indoor space or environment 100, such as the inside of a building, a room, or a retail store. The indoor environment 100 includes a plurality of appliances 104*a-n* (only five appliances 104*a-e* are shown in FIG. 1) (referred to collectively herein as appliances 104 and individually as appliance 104), a plurality of RF signal sources 108*a-n* (only three RF signal sources 108*a-c* are shown in FIG. 1), a plurality of UE devices 102 *a-n* (only one UE device 102 is shown in FIG. 1 and referred to collectively herein as UE devices 102 and individually as UE device 102), and an administrative computer server 106. The example RF signal sources 108 *a-c* are coupled to the server 106 via a network (wired or wireless (not shown)).

In one example, the appliances 104 *a-e* may be capable of wireless communication and/or be coupled to the network (wired or wireless). UE device 102 may communicate with the computer server or central control computer server 106 via the wireless network. UE device may further communicate and receive network services via other wireless networks (e.g., cellular networks (not shown)). For location and positioning purposes of the multiple elements (e.g., appliances, RF signal sources) in the indoor environment 100, a frame of reference may be assigned to the indoor environment 100. FIG. 1 illustrates a common frame of reference in Cartesian coordinates with x, y and z axes along the length, width and height of the building or room 100 respectively. A corner '$O_b$' of the interior of the building 100, or an interior of the room, is assigned as the origin of the common frame of reference. In one example, during a setup step, an administrator assigns and indicates the common frame of reference in an indoor map of the building 100, or alternatively, stores the assigned information in a database of the computer sever 106. It is noted that, the common frame of reference is fixed to the indoor environment or space 100 (e.g., to the interior of a building or the room). It is further noted that, the common frame of reference may not be an earth-fixed (geodetic) or earth-aligned (north-east-down) frame of reference.

It will be understood that, when the common frame of reference is associated with the room and the origin '$O_b$' is assigned to the corner of room 100, only the appliances 104 that are included in the room 100, may be in communication with the UE device 102 or the computer server 106. Appliances 104 in other rooms may not be in communication with the UE device 102. For example, appliances 104 that are located in room 100, and are visible to a user of the UE device 102, may communicate with the UE device 102. During a one-time setup step, an administrator, may use a simple survey of the building interior using length measurement devices, or any other method to assign position coordinates to the appliances 104 as well as the central control computer server 106. This step may be executed only once when the building is commissioned for the first time, and may be partially or fully repeated when additional appliances are installed or old appliances are either removed or moved around as their position relative to the interior space may have changed. The process may also include measurement of signal characteristics, such as RSSI, Angle of Arrival, Angle of Departure etc. that are received from a RF signal source 108 or a group of RF signal sources 108 in the indoor environment 100. For example, an administrator UE device 102 may initially download an indoor map and define the origin $O_b$ in the map. Following that, a reference RF signal source 108 may be placed at the origin $O_b$. The UE device 102 (of the administrator) may move or arrive at the respective positions of the appliances 104 and record the position information (e.g., coordinate points) based on the RSSI measurement values (with respect to the reference RF signal source). Accordingly, the appliances 104 may then be assigned their respective position information.

It is contemplated that, the UE device of the administrator may be calibrated, specifically, its antenna characteristics, with respect to the RF signal source 108 that transmits the reference RF signals. Moreover, the assignment of the position coordinates of the appliances may be integrated into the map, and/or compiled in to a computer searchable database. In addition, the database may include other information, that indicates the type of appliance, connectable communication information (e.g., Bluetooth address of various appliances 104 if any etc.), and other characteristics of the appliance relevant for control.

It is further contemplated that during an assignment or identification of an appliance, the height information of an average user of a UE device 102, orientation information of the UE device, and/or altitude information of the appliances may be taken into account. Such information may be generated and gathered using one or more attitude sensors such as an accelerometer, gyroscope, a pedometer, a compass, altimeter and a barometer. These sensors may be microelectromechanical sensor (MEMS) devices integral to the UE device 102. The administrator, may also assign orientation information of the appliances 104, in a manner similar to the position assignment.

The RF signal sources 108 may be, for example, any terrestrial RF transmitter or transmitter/receiver of wireless or RF signals, for example, IEEE 802.11 (Wi-Fi) access points. Other examples of RF signal sources 108 may include Bluetooth® access points, cellular telephone base stations, or other types of RF signal sources operating, for example, in the industrial, scientific and medical (ISM) band. The UE device 102 may be, for example, mobile telephones, Bluetooth or IEEE 802.11 or other ISM devices that are configured to receive the RF signals transmitted by the RF signal sources 108. The RF signals may include information that can be used to identify and locate the signal source, for example Wi-Fi signals may include an access point identifier (e.g. media access control identifier (MAC ID)), received signal strength indication (RSSI), time or phase offsets of received signals and/or round-trip delay time (RTT), which may be processed by the UE device 102 in order to determine a position. The RF signal sources 108 may themselves be appliances capable of wireless communication. The server or central control computer 106 may receive this information via RF signals conveyed through a logical communication path (not shown) from the UE device 102 and further process the information in order to calculate the position and orientation of the UE device 102 in the indoor environment 100 with respect to the pre-defined common frame of reference. In one example, UE device 102 may determine a position using fingerprinting techniques based on signal strength, and/or AoA information from Wi-Fi access points when the UE device 102 is configured to receive such Wi-Fi signals.

In one implementation, each of the RF signal sources 108 may be assigned a specific physical location in the indoor environment 100, for example, x, y, z coordinate points and orientation, for example, pitch, roll, yaw, with respect to the origin $O_b$ of the common frame of reference. The assignment of the position and orientation of the RF signal sources 108 may be performed in a way, similar to the positional and orientation assignment of the appliances 104. The position information and the orientation information of the RF signal sources may be stored in a database of computer server 106, by the administrator, along with their corresponding identification information (e.g., the respective MAC IDs or Bluetooth addresses). Alternatively, the RF signal sources 108 may store their respective positions, orientations and identification information and may be configured to communicate the assigned coordinate positions, orientations and identification information to the UE device 102 via RF signal signals. The UE device 102 may process the received position and orientation information of the RF signal sources 108, and/or the central control computer server 106, 3-D map of the indoor space 100, along with the output signals produced by internal attitude sensors such as the accelerometers and gyroscopes (e.g., Dead Reckoning), to determine its position and orientation information relative to the common frame of reference in the indoor environment.

In another example, UE device 102 may alternatively determine a position using signal strength or timing information from cell-phone transmitters, for example, using triangulation, trilateration, cell identity or fingerprinting techniques, when the UE device is configured to receive such cellular signals. In one implementation, the position UE device 102 may be determined based on triangulation using angle of arrival (AoA) and/or Angle of Departure (AoD) techniques.

For purposes of later discussion, several user equipment (UE) or mobile devices 102 appear in the drawing, to represent examples of the UE devices that may communicate with the RF signal sources 108, appliances 104 and the server 106. In the materials that follow, the terms UE device and mobile device are used interchangeably and include a wearable UE device. UE devices 102 can take the form of portable handsets, smart-phones, tablets, personal digital assistants, or mobile devices 102, although they may be implemented in other form factors. Example UE devices 102 may be wearable devices. In one example, the wearable device may be a smartwatch. The smartwatch is configured to have some or all the functionalities of a UE device 102 in addition to a physical form factor that allows the smartwatch to be worn on a user's wrist. In another example, the wearable UE device 102 may be a pair of smart glasses, that may be worn like a pair of conventional eyeglasses and may communicate with a target appliance 104, when a user looks at the target appliance 104 (i.e., pointing the smartglass at the appliance) or monitoring gaze direction, for example by monitoring the direction of the user's pupils through the lenses of the smartglass.

Figure 2A:
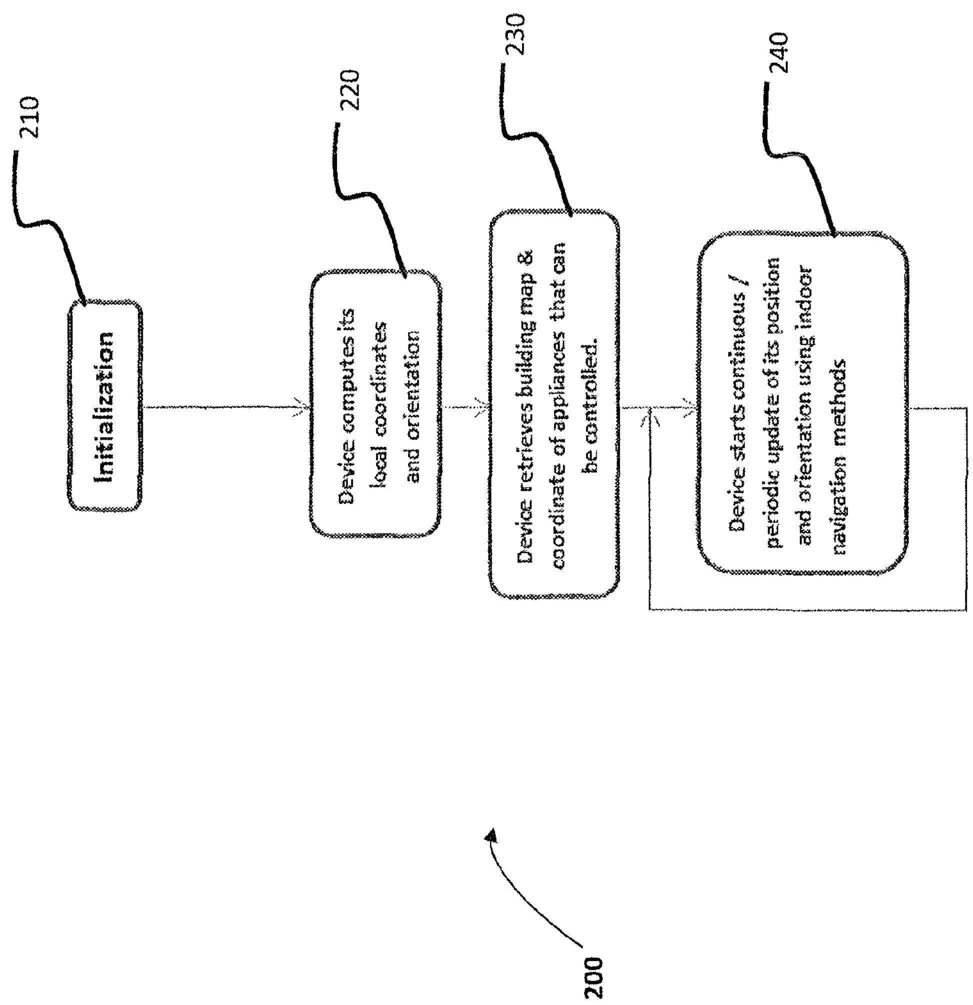
FIG. 2A is a flow-chart diagram of example processes executed by a UE device to facilitate determination of location within the example indoor environment of FIG. 1.
Figure 3A:
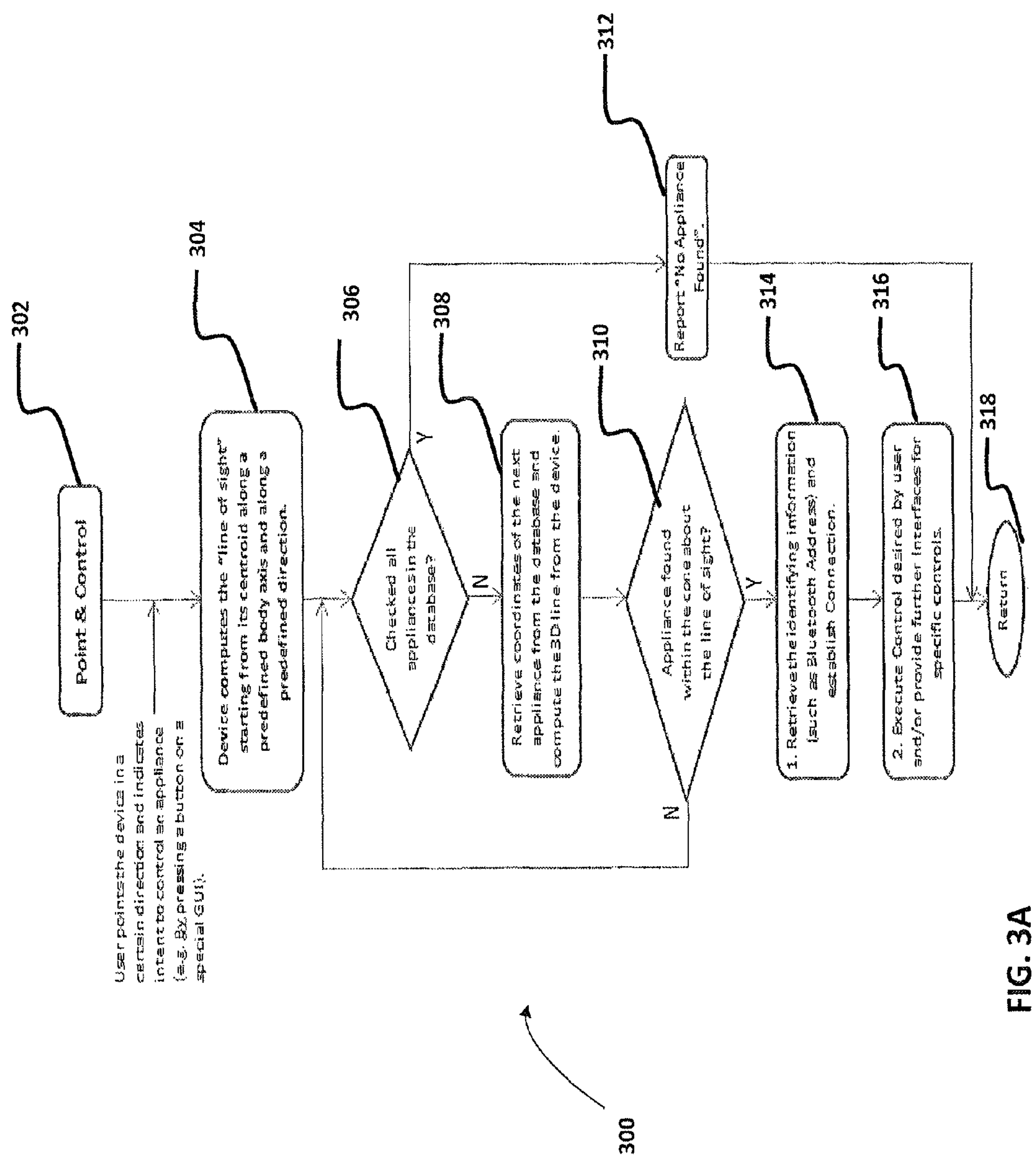
FIG. 3A is a flow-chart diagram of details of another example process executed by the UE device to identify an appliance in the example environment of FIG. 1 according to one or more implementations described herein.

In further instances, a mobile device application can be written to execute on a Windows Mobile based mobile device, Android, I-Phone, Java Mobile, or RIM based mobile device such as a BlackBerry or the like. In one example, the mobile device application may be an appliance control application (e.g., a control menu of the appliance). The appliance control application may be associated with different applications running on the UE device 102. For example, the appliance control application may be associated with a camera application, a video application, an audio application (e.g., a speaker-phone application and a microphone application), a location-based application (e.g., a GPS-based application), and/or other types of applications. The appliance control application may include a user interface such as a graphical user interface (GUI), for example an appliance control menu that may be displayed on the display of the UE device 102, while the various operations and processes, as shown in FIGS. 2A and 3A, are performed. In one example, the user interface and the menu items may be presented to and executed by the user through audio menu selections and commands.

In one implementation, a user may be inside a retail store 100 and would like to learn or try-out features of a target appliance 104, such as a television, prior to purchasing the television. In this example, the user may initially identify the television with a smartglass 102, by looking at the television, as described above. In one example, the television may flash a light (e.g., a light emitting diode (LED)), indicating to the user that the television (i.e., the target appliance) has been identified. Alternatively, the smartglass may provide a notification (e.g., on a display of the smartglass) indicating that the television has been identified.

Upon identification, the user may download (e.g., from the server of the retail store 106) an appliance control application for the television. The user may then control the television by selecting menu items using the smartglass control interface, and upon establishing wireless communication link between the television and the smartglass.

Alternatively, the user may operate the television via voice commands (e.g., by speaking out the commands). In this example, the control interface of the application may provide a notification to the user indicating that an option for verbal command is available.

It is contemplated that, a user (e.g., a potential super store customer) may be able to access information such as pricing, ingredients or other relevant details about an object (e.g., merchandise or a food item) by pointing the UE device 102 towards the object (that is placed on a super store shelf). In such a case, the UE device 102 establishes a wireless communication with the central computer server 106, sends its location and line of sight information, and further requests the desired information about the object. Thus, the user may then be able to obtain the desired information about the object without scanning a bar code or a QR code or through any human intervention (e.g., a shopper's assistant).

In another implementation, the user may use voice commands to identify a desired appliance using the UE device 102. In this implementation, the user may initially download a generic appliance control application from the server 106, upon entering the store 100. The user may then speak to the UE device 102, to say, "I want to operate the television in front of me", or may specify in the voice command, a make and a model number of the television (i.e., the target appliance). The UE device 102 may transmit the specification or the location of the target appliance to the server 106. The server 106 may then consult the indoor map and/or the database to identify the target appliance, and upload an appliance control application, corresponding to the target appliance, on to the UE device 102. Upon obtaining the appliance control application of the target appliance 104, the UE device 102 (i.e., the user of the UE device 102) may operate the target appliance via inputs on a GUI or voice commands. The operations may be carried out upon establishing a communication link with the target appliance or the central server.

Appliances 104 may be household appliances such as lights, fans, air-conditioners, air-heaters, media players, display devices, Blu-ray players, televisions, etc. Appliances 104 may be positioned at various locations, for example, on the ceiling, walls of the building. Following identification of the appliance 104, the appliance, if capable of wireless communication, may be configured to communicate with UE device 102 via a communication technology that is compliant with, and common to both the appliances 104 and the UE device 102. Each of the appliances may be assigned a respective physical location in the indoor environment 100, for example, x, y, z coordinate points, with respect to the origin $O_b$ of the common frame of reference. The appliances may be assigned with their respective identification (e.g., Bluetooth identification address or any other types of identification) by the administrator. The position information and the identification information may be stored in a database or in an indoor map of the indoor environment 100 in the computer server 106. The database or the indoor map, in one implementation may include information identifying a type of each of the appliances 104. In one example, the UE device 102 may communicate with the computer server 106 to receive the database of appliances and/or the indoor map that includes the location and the identification information of the appliances 104. The appliance 104 may have visual indicators, for example, LEDs, that may flash to indicate to a user of the UE device 102 that the appliance has been identified. Moreover, as disclosed in detail with reference to FIG. 4C, appliance 104 communicates with other communication devices via appliance controller 105. Appliance 104 may be connected to the appliance controller 105 via a connector (e.g., USB connector). In one example, an appliance 104 may not be configured for wireless communication. In that example, the appliance 104 may be connected to the central control server 106 in order to be controlled by the UE device 102 using the aforementioned steps. However, an appliance 104 that is configured for wireless communication, may be directly controlled by the UE device 102 after the identification step is carried out.

Computer server 106, for example, may be an administrative server of the indoor environment 100. In one example, computer server 106 may store a map of the indoor environment 100. The computer server 106 may also store a database that includes position coordinates, orientation, types of the appliances, and identification information of the appliances 104. The computer server 106 may be configured for wireless communication and may establish communication with the UE device 102 as well as appliances 104 and/or other RF signal sources 108.

In one example, the computer server 106 may be configured to perform authentication of users (e.g., customers of a retail store, visitors of a building). In this example, the computer server 106 stores an identification database (e.g., username, password, biometric information) of the users of the UE device 102. The computer server 106 may request users to verify their identification upon entering the indoor environment 100. It is contemplated that, for security reasons, the computer server 106 may verify the identification of the users prior to giving access to the database of the appliances 104 and the map of the indoor environment. It is further contemplated that, the authentication may be performed over a secure communication channel between the UE device 102 and the computer server 106.

Examples of a UE device, server and appliance controller are described below with reference to FIGS. 4A, 4B and 4C.

Reference is now made to FIG. 2A, that illustrates an exemplary method 200 to determine position and orientation of UE device 102 in the environment 100.

At step 210, the UE device 102 may be initialized when a user of the UE device 102 enters the space or environment 100. In the examples described below, the space or environment is an indoor environment. Upon crossing the building entrance, which may be automatically detected using proximity sensor based access control systems (not shown), the UE device may establish an initial estimate of its position and orientation. Subsequently initialization may include receiving a communication from the computer sever 106, such as a "welcome" notification that may contain further information about the coordinate frame and steps to calibrate the UE device, which may be a one-time process for the particular building (as such any subsequent visit to the building by the user may not require this step). Initialization may also include a request from the computer server 106 to verify an identification of the user of the UE device 102, once the user enters the space 100 (as discussed above).

At step 220, upon successful authentication of the UE device 102, the UE device 102 may connect to the RF signal sources 108 of the environment 100. The central computer server may also be one of the RF signal sources. The UE device 102 may receive RF signals (e.g., Wi-Fi signals) transmitted by the RF signal sources 108 (e.g., Wi-Fi access points), and identify the signal sources. In one example, the Wi-Fi signals may include MAC ID, RSSI, time or phase offsets of received signals and/or RTT information, and respective coordinate positions of the RF signal sources in the environment 100. UE device 102 may process the received information and determine its position and orientation in the environment 100. Alternatively, the server 106 may receive this information via RF signals conveyed through a logical communication path (not shown) from the UE device 102, and further process the information in order to calculate a position of the UE device 102.

UE device 102 may also determine its orientation based on various attitude sensors and technologies available to the UE device 102, such as a digital compass, an accelerometer, and/or gyroscope. It is contemplated that orientation may be determined based on a reference frame that is associated with the body of the UE device 102 (as described in detail below with respect to FIG. 2B). In one example, a gyroscopic sensor may detect 3-axis angular acceleration around X, Y and Z axes (e.g., $x_d$, $y_d$ and $z_d$) to calculate yaw, pitch, and roll of the device in the body-fixed frame of reference. In addition, the accelerometers mounted along the axes, may detect linear acceleration along the three axes (e.g., it may detect acceleration shake, vibration, shock, or a fall of the UE device 102). The combined data from the accelerometer and the gyroscope provides detailed and precise information about the UE device's 6-degree of freedom movement in space (e.g., the indoor space) with reference to the common frame of reference. For example, 3 axes of the gyroscope combined with the 3 axes of the accelerometer enable the UE device 102 to determine approximately how far, fast, and in which angular as well as linear direction it has moved in the indoor space with respect to the common frame of reference associated with the indoor space.

Furthermore, in order to perform the identification of the appliances 104 (as described with reference to FIGS. 3A-3E), an administrator or a user using the UE device 102, may initially pre-survey the indoor environment 100 to gather various location and position related information of the space and of the various appliances located in the space. At step 230, for example, the UE device may download: (1) a 3-D Map (e.g., an indoor map) of the space in which the pre-defined common frame of reference and origin $O_b$ of the reference is defined (e.g., an interior corner of the space, being the origin of Cartesian coordinate system as shown in FIG. 1), and/or (2) 3-D coordinates information of the appliances 104 in the indoor environment 100. The download may be initiated by the user of the UE device 102 by sending a request to the computer server 106, upon entering the space.

Alternatively, the administrative computer server 106 may send a notification to the UE device that the indoor map of the space and the 3-D coordinates information are available to be downloaded, once the user of the UE device 102 enters the space. In one example, the computer server 106 may send a notification to the UE device 102 that an update of the indoor map and the coordinates information is available, upon determining that the user of the UE device is a preexisting user (e.g., a preexisting customer of a retail store, a regular visitor of a museum, or a service personnel of the space). The determination may be based on received identification of the UE device 102. Upon receiving the identification of the UE device 102, the computer server 106 may correlate the received identification of the UE device with a database that includes identification of the previously registered UE devices. Upon verification, the computer server may allow the download of the updated map or appliance location data.

Upon downloading the indoor map and the position information of the appliances 104, the UE device may then compute its 3-D position and orientation in the space 100 with respect to the origin $O_b$ of the common predefined frame of reference.

Figure 2B:
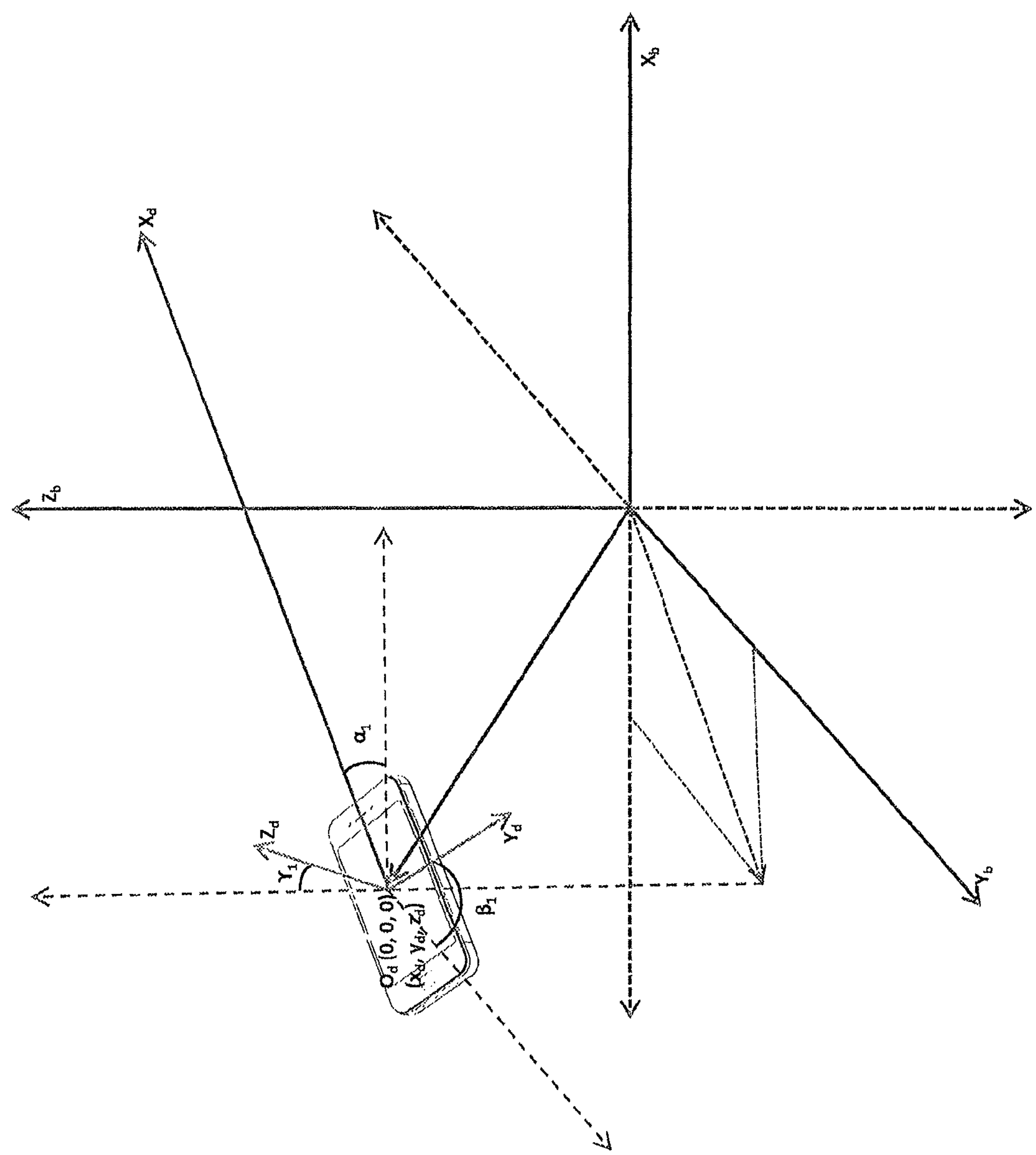
FIG. 2B is a diagram illustrating various exemplary frames of reference associated with the example environment of FIG. 1 and an exemplary UE device.

For example, as shown in FIG. 2B, the coordinate frame denoted by $x_b$, $y_b$, & $z_b$ is the pre-defined common frame of reference, fixed to the interior of the space 100 with the origin $O_b$. The coordinate frame denoted by $x_d$, $y_d$ & $z_d$ is the frame of reference fixed to the body of the UE device 102. UE device 102 calculates the origin $O_d$ of the fixed body reference, with respect to the predefined common frame of reference. UE device 102 also computes the orientation/alignment with respect to the predefined frame of reference. For example, the UE device 102 calculates angles $\alpha_1$, $\beta_1$ and $\gamma_1$, as shown in FIG. 2B. The processor of the UE device may be configured to perform the calculation related to angles and positions.

The UE device may further compute a the 3-D orientation (i.e. the Roll, Pitch and Yaw angles of the device), as described above, to improve the orientation calculation based on accelerometers, digital compass, gyroscopes or a combination thereof, with respect to the predefined frame of reference.

Once the UE device 102 has determined its initial position and orientation with respect to the predefined frame of reference, at step 240, the UE device 102 may periodically update its position and orientation using indoor navigation technologies such as dead-reckoning using accelerometers and gyroscopes, RF based methods using RSSI, AoA, AoD, or any other established technique available to the UE device, for example, as the UE device 102 navigates from position A to position P in the indoor environment 100, as shown in FIG. 1. This may be part of the indoor navigation process initiated by the user of the UE device.

References are now made to FIG. 3A that describes an exemplary method 300 for identifying and controlling one of the example appliances 104 in the indoor environment 100. For example, upon arriving at point P (as shown in FIG. 1), the UE device 102 may be pointed towards a desired appliance 104 that the user wishes to control. For example, the user may arrive within a range in which the appliances 104_a-d_ are visible from point P, and may point the UE device 102 or orient the wearable UE device 102 towards the desired appliance 104-_a_.

In one example, at step 302, the user may point the UE device 102 at the desired appliance 104-_a_ and may press a button on the UE device 102 which instructs the UE device 102 to identify the desired appliance. Upon doing so, the UE device 102 computes parameters (described below) to identify and select desired appliance 104. As described earlier, in another implementation, the user may generate a sound (e.g., voice commands), or look at the device through smartglass lenses, in order to identify a desired appliance.

In one implementation, the UE device 102 may start the computation of the parameters, upon receiving instructions (e.g., press of a button) from the user via a graphical user interface (GUI) of the UE device 102. The GUI may be associated with an application for identification and control of the appliance in the space. In one example, the application may be downloaded from the computer server 106, when the user enters the indoor environment 100.

In another implementation, the UE device may automatically start the computation, once it arrives at a destination or is being pointed at the desired appliance. Such a situation may arise if the UE device is not already carrying out indoor navigation and hence is not aware of its position and orientation at the instant when the user points the UE device towards an appliance. In that example, the UE device may initially communicate with all the desired appliances via a wireless communication link (e.g., Bluetooth or near-field communication (NFC)) by picking their connectable identification from the database as downloaded from the central server in step 230. The UE device may calculate an angle of arrival (AoA) parameter in order to initiate the identification of the desired appliance. In this example, the UE device 102 may calculate the AoA upon processing signals (e.g., Bluetooth signals), or direction finding beacons, transmitted from the appliances 104. The UE device 102 may include an array of antennas (coupled with multiple receivers) and record amplitude and phase measurements of the signal received by each antenna in the antenna array. In addition, for the AoA calculation, the UE device 102 may take into account the configuration and position information of the antennas within the antenna array. Moreover, out of all the signals received by the UE device from the different appliances, the UE device may select the desired appliance based on: where the respective signals of the appliances (i.e., the position information of the appliances) were received from, and the position and orientation information of the UE device. In case of ambiguity (e.g. if multiple appliances are identified within the same AoA or AoD), the UE device may present a narrowed down list of appliances to the user to select and control. Details of the antenna array and AoA calculations are provided in the description of FIG. 4A.

It is contemplated that, in some implementations, an appliance may include multiple transmit antennas (not shown). In such implementations, the transmitted signals (e.g., direction finding beacons) from the multiple transmit antennas may be received by antenna 404 of the UE device 102. In one example, the UE device 102 may determine phase differences among the signals that are received by the UE device. For example, the processor 408 of the UE device 102 may process the respective times at which each of the signals are received, and may determine that the signal received from a first transmit antenna of the appliance is delayed by a time period with respect to another signal received from a second transmit antenna. Based on the delayed time measurements, and other information (e.g., relative distance information of the antennas), the UE device 102 may calculate the angles of the signals leaving the appliance with respect to the UE device (e.g., an angles of departure).

At step 304, the UE device 102, upon being pointed towards the desired appliance and upon receiving the instructions, computes a LoS with respect to the predefined common reference frame. The LoS may be calculated based on the UE device's current 3-D coordinates and orientation information (see FIG. 2A). Moreover, the LoS may be calculated along an axis of the fixed body frame reference of the UE device as illustrated in FIG. 3B, for example.

Figure 3B:
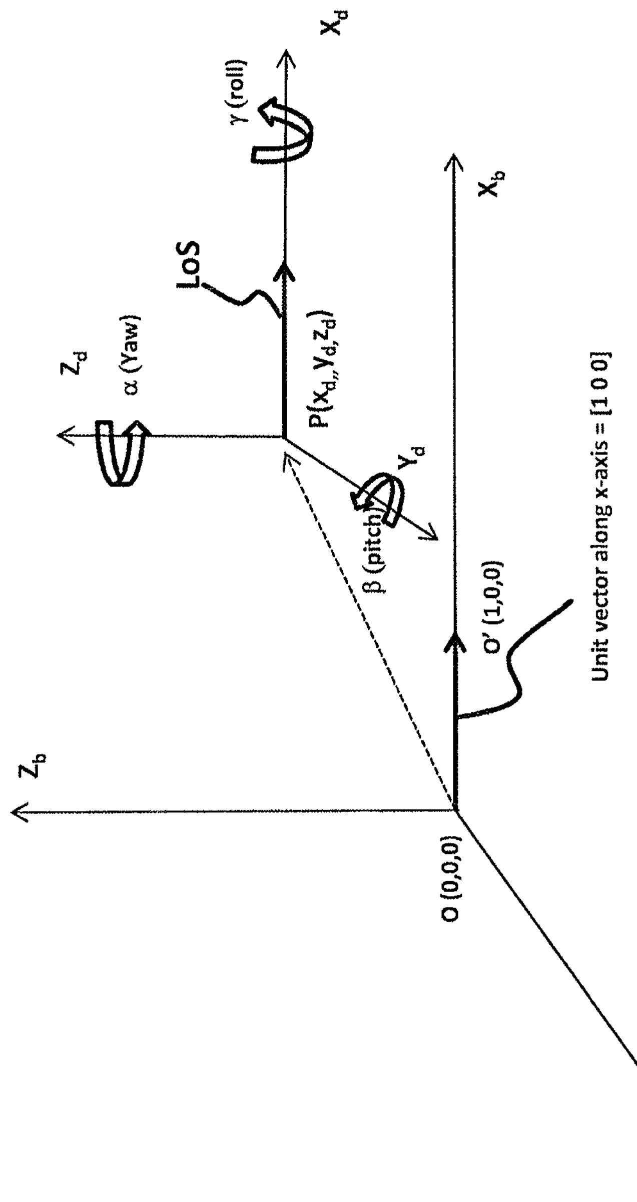
FIG. 3B is a diagram illustrating an exemplary line of sight (LoS) associated with an example UE device with references to the various exemplary frames of reference of FIG. 2A.

An example calculation of LoS is now described with respect to FIG. 3B. As shown in FIG. 3B, $X_b$-$Y_b$-$Z_b$ is the common pre-defined frame of reference, namely the reference frame of space (RFS), that is fixedly associated with the indoor environment 100 (e.g., interior of the space), and $X_d$-$Y_d$-$Z_d$ is the frame of reference that is associated with the body of the UE device 102, namely the reference frame of device (RFD). For example, the axes in RFD may align with the length, breadth and thickness of the UE device.

In general, the LoS may be obtained after a rotation and translation of the RFD with respect to the RFS.

In one example, LoS is calculated along the axis $X_d$ (i.e., the UE device 102 is pointed along the x-axis of the UE device). In this example, P is a current position of the UE device 102 in the indoor environment 100. The position vector of the UE device at point P, is $$\overrightarrow{OP}=x_d\hat{i}+y_d\hat{j}+z_d\vec{k} \tag{1}$$

In order to obtain the LoS, the unit vector OO' is rotated (where, [1 0 0] is the original vector before rotation along $X_b$):

$$\begin{bmatrix} \cos(-\alpha) & -\sin(-\alpha) & 0 \\ \sin(-\alpha) & \cos(-\alpha) & 0 \\ 0 & 0 & 1 \end{bmatrix} \begin{bmatrix} \cos(-\beta) & 0 & \sin(-\beta) \\ 0 & 1 & 0 \\ -\sin(-\beta) & 0 & \cos(-\beta) \end{bmatrix} \tag{2}$$

-continued $$\begin{bmatrix} 1 & 0 & 0 \\ 0 & \cos(-\gamma) & -\sin(-\gamma) \\ 0 & \sin(-\gamma) & \cos(-\gamma) \end{bmatrix} \begin{bmatrix} 1 \\ 0 \\ 0 \end{bmatrix} =$$

$$\begin{bmatrix} \cos(\alpha)\cos(\beta) & \sin(\alpha) & -\cos(\alpha)\sin(\beta) \\ -\sin(\alpha)\cos(\beta) & \cos(\alpha) & \sin(\alpha)\sin(\beta) \\ \sin(\beta) & 0 & \cos(\beta) \end{bmatrix} \begin{bmatrix} 1 & 0 & 0 \\ 0 & \cos(\gamma) & \sin(\gamma) \\ 0 & -\sin(\gamma) & \cos(\gamma) \end{bmatrix} \begin{bmatrix} 1 \\ 0 \\ 0 \end{bmatrix} =$$

$$\begin{bmatrix} \cos(\alpha)\cos(\beta) \\ -\sin(\alpha)\cos(\beta) \\ \sin(\beta) \end{bmatrix}.$$

Equation (2) is the unit vector after rotation. As shown above, Equation (2) is obtained by rotating the unit vector [1 0 0] around the z, y and x axes.

In order to obtain the LoS, the rotated vector obtained in Eq. (2) is translated (i.e., vector OP is added). Adding Eq. (2) to Eq. (1), vectorially, $$\text{LoS}=[\cos(\alpha)\cos(\beta)\hat{i}-\sin(\alpha)\cos(\beta)\hat{j}+\sin(\beta)\hat{k}]K+[x_d\hat{i}+y_d\hat{j}+z_d\hat{k}]=(x_d+K\cos(\alpha)\cos(\beta)\hat{i}+(y_d-K\sin(\alpha)\cos(\beta))+(z_d+K\sin(\beta))\hat{k} \tag{3}$$

where i, j & k are unit vector along the axes of RFS and “K” is a parameter.

Note that, LoS, as calculated in Eq. 3, is with respect to RFS (i.e., with respect to the space).

Referring now back to FIG. 3A, at step 306, UE device 102, having computed its LoS at step 304, may attempt to find if there is any appliance or object that lies either directly on the LoS or close to the LoS.

Figure 5A:
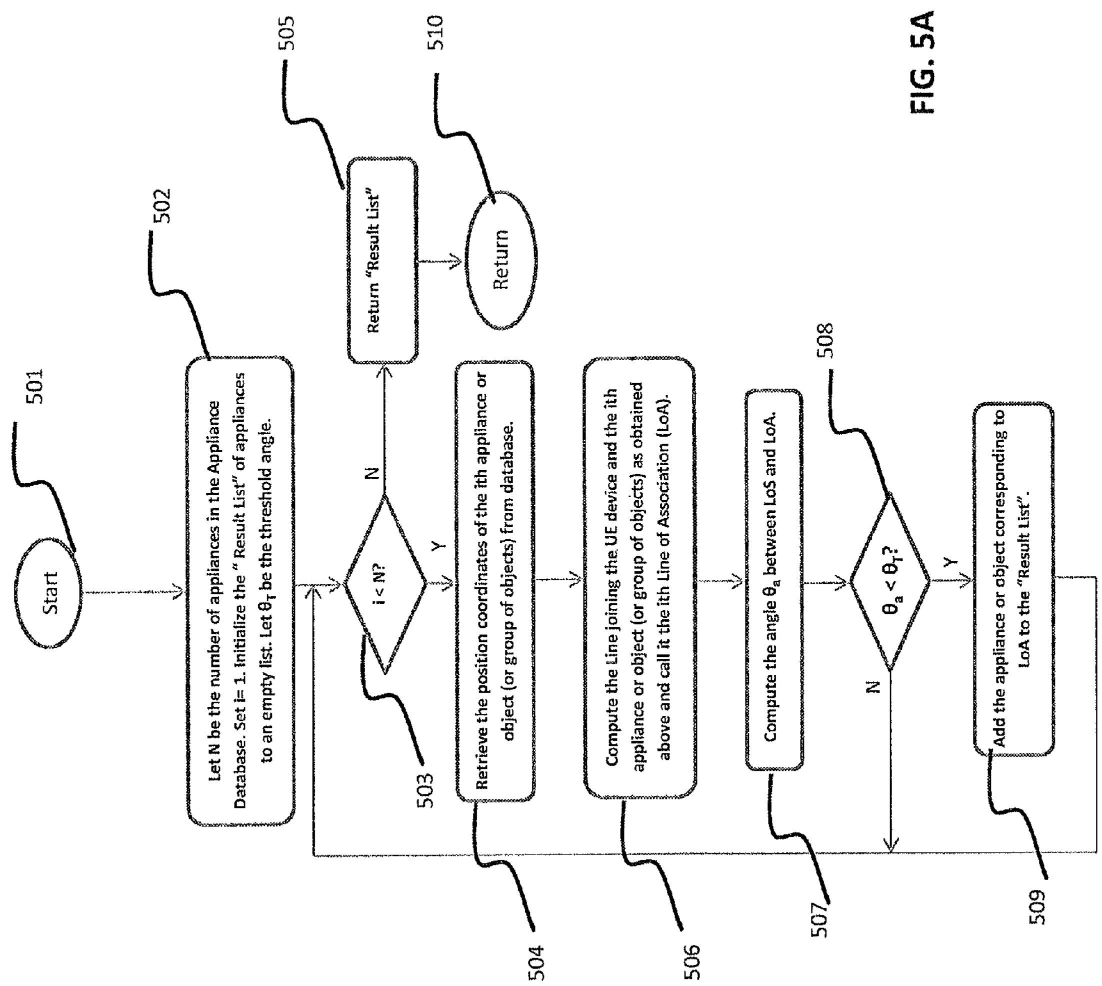
FIG. 5A is a flow-chart diagram of details of an example process to identify an appliance in the example environment of FIG. 1 according to one or more implementations described herein.
Figure 5B:
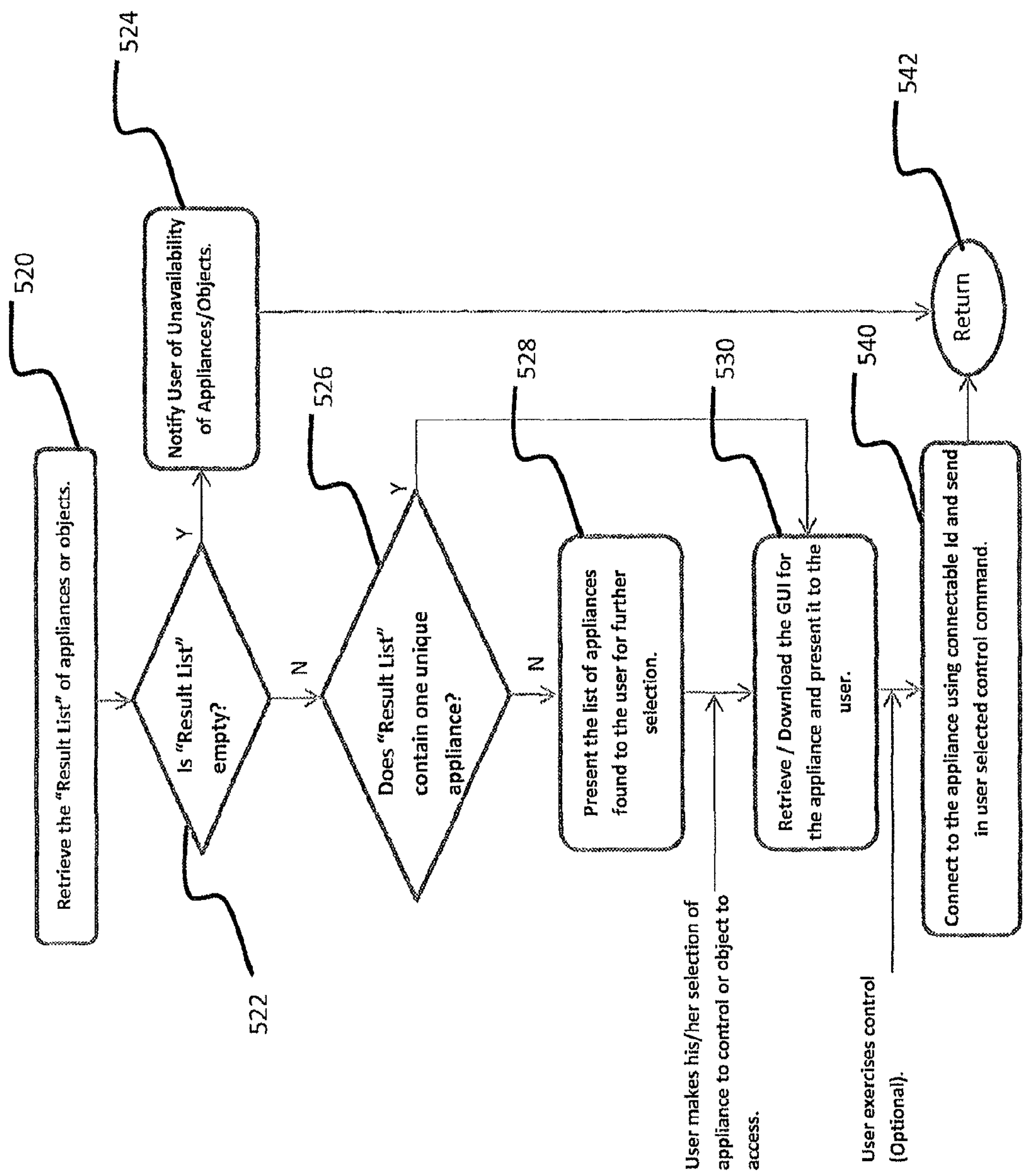
FIG. 5B is another flow-chart diagram of details of another example process executed by a UE device to identify and control an appliance in the example environment of FIG. 1 according to one or more implementations described herein.
Figure 5C:
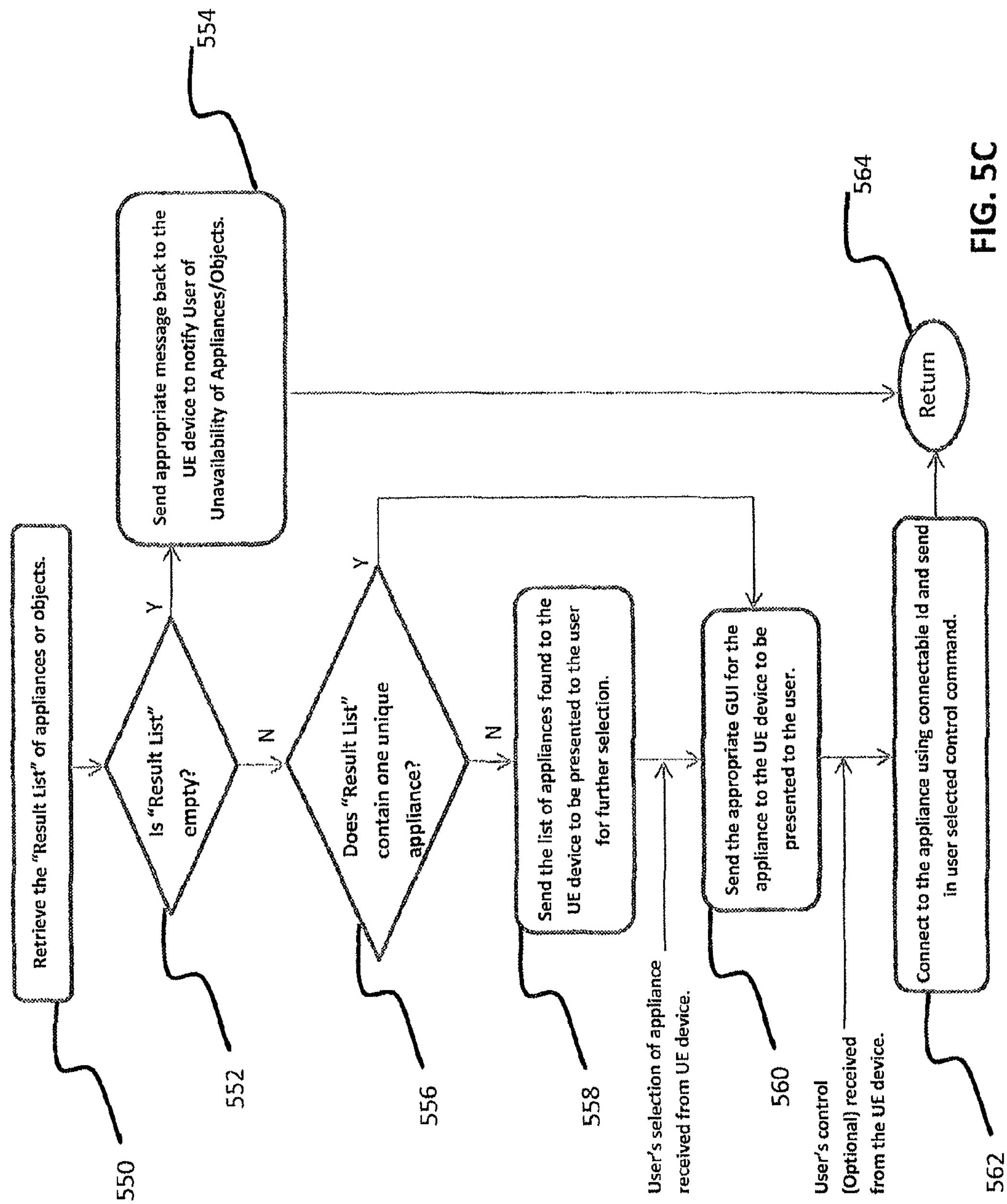
FIG. 5C is a flow-chart diagram of details of an example process executed by a computer server to identify and control an appliance in the example environment of FIG. 1 according to one or more implementations described herein.

A general overview is now given with references to FIGS. 5A-5C. For example, in order to identity the appliance or objects being pointed at by the UE device, the UE device 102 may carry out the following steps of FIG. 5A for each of the appliances or objects listed in the database. It is noted that, the steps outlined in FIG. 5A may be carried out locally within the UE device itself. Alternatively, the UE device 102 may forward its LoS to the central control computer server 106 to carry out the computations.

At step 501, the UE device 102 may retrieve its position information (e.g., 3-D coordinates and orientation information), LoS (as calculated at step 304) and a predefined threshold angle (e.g., received from the computer server 106), and a database of the appliances and objects. Alternatively, if the steps were to be performed by the server, the position information and the LoS of the UE device may be received by the server from the UE device 102.

At step 502, the UE device 102 may initialize parameters, such as, N for the number of appliances and/or objects, $\theta_T$ for the predefined threshold angle and a counter i. In one example, N=20 and a counter i=1.

At step 503, the UE device compares the counter i with N, and at step 504, retrieves the position coordinates of the $i^{th}$ appliance (or object), upon determining that the counter i is less than N (i.e., 1<20).

However, if there is no appliance or object, at step 505, UE device then returns a result list identifying the result list is empty. The UE device may then switch off the GUI associated with the identification of appliance at step 510.

Figure 3C:
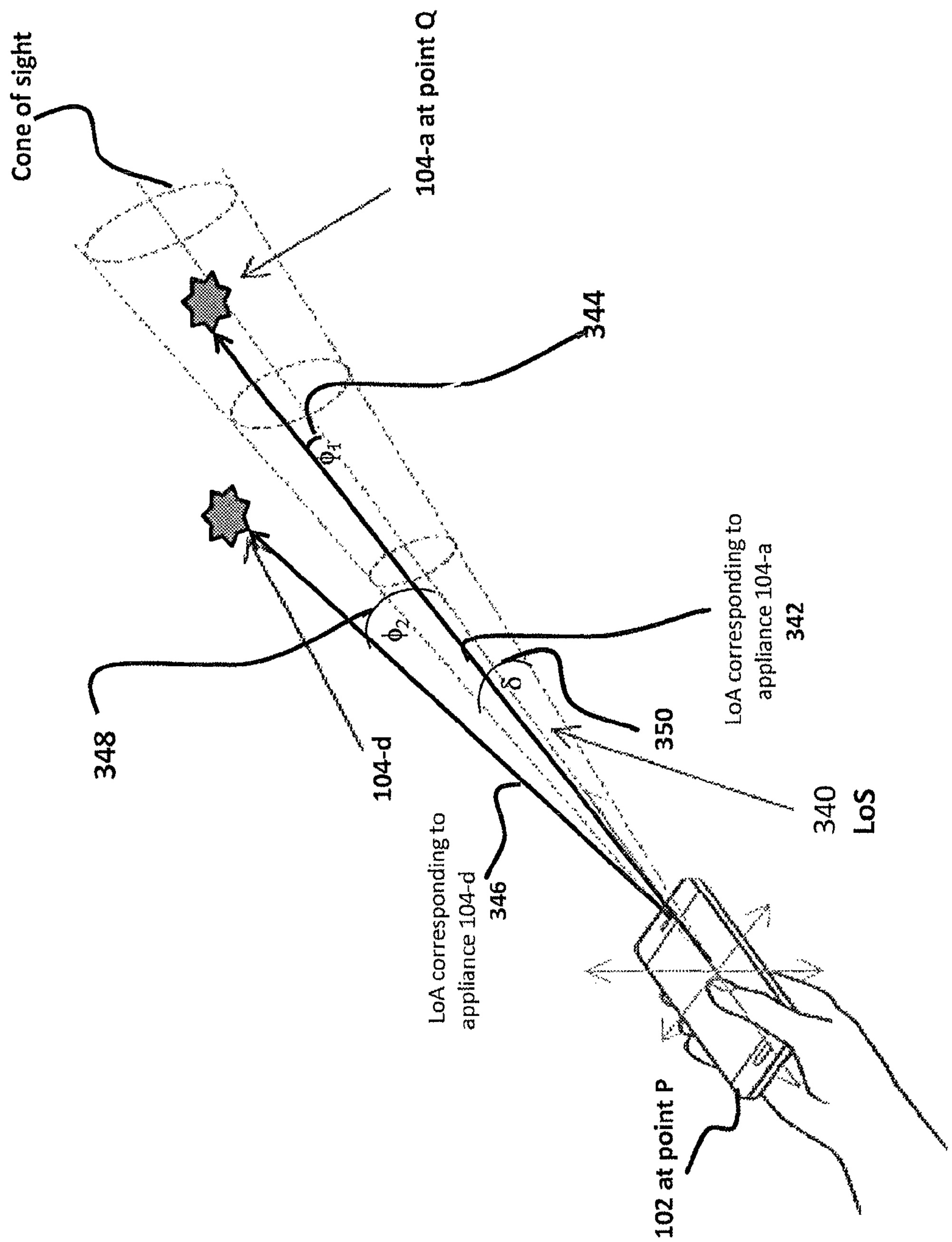
FIG. 3C is an exemplary diagram illustrating example Line of Association (LoA) that are associated with example appliances and an exemplary LoS associated with the UE device that is used to identify one of the example appliances.
Figure 3D:
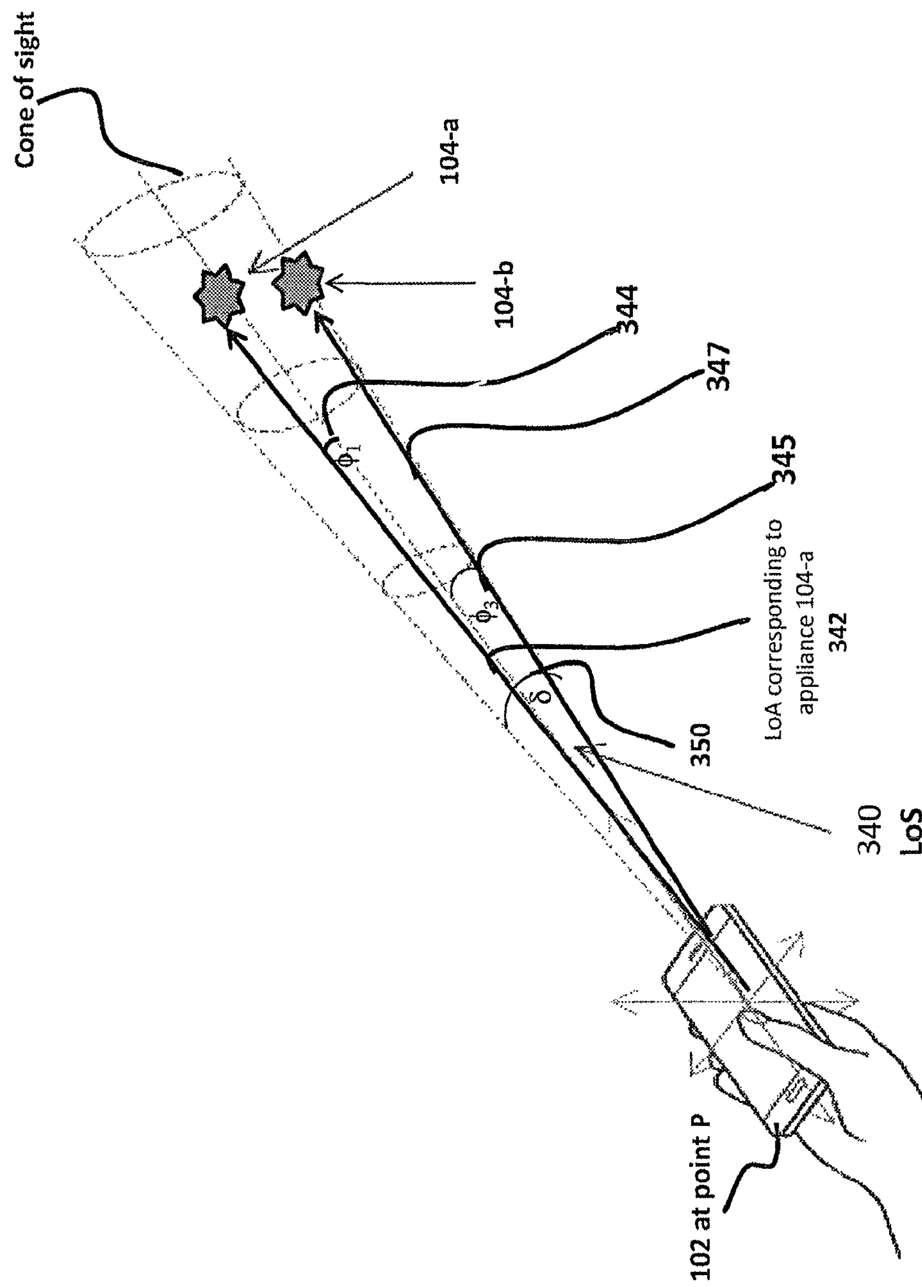
FIG. 3D is an exemplary diagram illustrating example Line of Association (LoA) associated with example appliances and an exemplary LoS associated with the UE device that is used to identify multiple example appliances.

At step 506, the UE device 102 picks the ith appliance's 3D coordinates and computes an equation of the line joining the UE device and the ith appliance, (e.g., as denoted as line of association (LoA) by 346 in FIG. 3C and 342 in FIG. 3D).

At step 507, the UE device computes the angle between the LoS and the LoA (e.g., $\theta_a$) and compares the computed angle with the predefined threshold angle ($\theta_T$) (step 508).

If the computed angle (between the LoS and the LoA of the ith appliance) is less than the predefined threshold angle, then the appliance is determined to be within the cone of sight of the UE device, and about the LoS, and thus may be one in which the user is interested. As such, at step 509, the appliance is then added to the result list. However, if the calculated angle does not meet the threshold angle criterion (at step 508) the appliance is not added to the result list. After this, the process goes back to step 503 and checks for the next appliance. It is contemplated that, at the end of the process, when multiple appliances are found within the cone about the LoS, the appliance closest to the device may be reported or presented to the user. Alternatively or in addition, when multiple appliances are present in the final result list, this narrowed down list may be presented to the user for further selection and control. It is also contemplated that, at the end of the process, a distance test or any other design criteria may be employed to further narrow down the result list to find if there is a unique appliance.

As mentioned above, the UE device 102 may perform the steps of FIG. 5A locally. FIG. 5B provides an overview of controlling the appliances once the UE device 102 has generated the result list.

At step 520, UE device 102 retrieves the result list of appliances or objects that were determined to meet the predetermined threshold angle criteria.

At step 522, UE device 102 determines the content of the result list.

At step 524, the UE device may notify the user of the UE device of unavailability of appliances or objects, when the UE device 102 determines that the result list is empty. In one example, the notification may be a text message presented on the UI of the UE device 102. The GUI that is associated with the identification and control may then be turned off at step 542.

In another example, the UE device 102 may determine that the result list is not empty, and at step 526, the UE device may further determine that the result list stores at least one appliance.

If the UE device determines that the result list includes at least one appliance, at step 530, the UE device downloads or retrieves a GUI that is associated with the appliance (e.g., from the central computer server 106).

At step 540, the UE device 102 may establish a communication channel with the appliance using connectable identification (e.g., Bluetooth address of the appliance) and further control the appliance.

In another example, at step 526, the UE device may determine that the result list includes multiple appliances that meet the threshold angle criterion.

As such, at step 528, the UE device may present the list of the appliances to the user. Upon receiving the list of appliances, the user may select which appliance he/she wishes to control.

Upon making the selections, the user may download the appropriate GUIs for the selected appliances and further connect and control the selected appliances as described above at steps 530 and 540. The appropriate GUIs may be turned off once the control of the appliances are completed at step 542.

As mentioned above, in one example, the computation of the parameters related to the identification of the appliances may be carried out at the remote central computer server 106. That is, the steps of FIG. 5A may be performed by the server 106 and the result list database of the appliances may be stored in the memory of the central computer 106. In this example, the UE device provides the computed LoS, position coordinates of the UE device and other control parameters to the central server 106.

As described in FIG. 5C, At step 550, the computer server 106 retrieves the result list of appliances or objects that were determined to meet the predetermined threshold angle criterion. The retrieval of the result list database may be triggered upon receiving a request from the UE device to search for appliances or objects that matches the LoS of the UE device 102.

At step 552 (similar to step 522 of FIG. 5B), the computer server 106 determines the content of the result list database.

At step 554, the computer server 106 notifies the user of the UE device of unavailability of appliances with appropriate message, when the computer server 106 determines that the result list is empty. In one example, the notification may be a text message presented on the UI of the UE device 102 and sent from the computer server. As such, the GUI on the UE device, that is associated with sending the request to the computer server for identification and control of appliances, along with any programs running on the server may then be turned off at step 564.

In another example, the computer server 106 determines that the result list is not empty, and the server 106 then proceeds to step 556 to further determine if the result list stores exactly one appliance.

When the computer server 106 determines that the result list includes exactly one appliance, at step 560, the computer server 106 transmits an appropriate GUI that is associated with the appliance to the UE device 102.

At step 562, the computer server 106 establishes a communication channel with the appliance using connectable identification and further control the appliance, upon receiving user selected control command from the UE device 102.

In another example, the computer server 106 may determine that the result list includes multiple appliances that meet the threshold angle criterion. As such, at step 558, the computer server 106 may send the list of the appliances to the UE device 102. Upon receiving the list of appliances, the user may select which appliance he/she wishes to control and send it back to the computer server 106.

Upon receiving the selection from the UE device, the computer server 106 may transmit the appropriate GUIs for the selected appliances and further connect and control the selected appliances as described above at steps 560 and 562. The GUI that is associated with sending request to the computer server for identification and control of appliances along with any programs running on the server 106 may then be turned off at step 564.

As described above, FIG. 5A provides an overview of the steps taken either by the UE device or the server to identify an appliance. Details of the process (e.g., steps 503-509) related to the calculation of the angles, and selection of an appliance based on threshold angle criterion are now provided below with references to FIGS. 3A, 3C and 3D.

Referring back now to FIG. 3A, at step 308, UE device 102 retrieves the stored position information of the appliances 104. The position information of the appliances may include the 3-D coordinates of the appliances (that were downloaded with the indoor map) within the indoor environment 100.

The UE device 102 then computes lines of association, LoAs, for all the appliances 104. The LoAs are lines between the UE device 102 and the respective appliances 104. The calculations of the LoAs may be based on the downloaded 3-D coordinates of the appliances and the current position (e.g., 3-D coordinates) of the UE device 102.

As further shown in FIG. 3C, line 342 corresponds to a LOA for the appliance 104-*a* located at a point Q, and line 340 corresponds to the LoS of the UE device 102. Line 342 is calculated, by the UE device 102, based on the 3-D coordinates of point P and point Q. It is noted that, one skilled in the art would know how to calculate an equation of a line given two points in a given coordinate system. In a similar fashion, UE device 102 calculates the LoA 346 for the appliance 104-*d*. For brevity and discussion purposes, not all LoAs are shown, however, UE device calculates all the LoAs for all the appliances 104.

UE device 102 compares the LoS 340 with all the LoAs including LoA 346 and LoA 342, in order to determine if any of the LoAs matches with the LoS 340. For example, the determination may include comparisons of the equations of LoS and the LoA and finding the angle they subtend at the device, at point P, P being the point common to both the lines. If the UE 102 determines that there is an exact match between the LoS 340 and one of the LoAs, the method moves to step 314 and skips steps 310, and selects the appliance corresponding to the exactly matched LoA.

However, if the UE device 102 determines there is no exact match between the LoS 340 and all the calculated LoAs, then the method moves to step 310.

It is contemplated that it may be difficult to achieve an exact match between the LoS and one of the calculated LoAs, because the user of the UE device may not accurately point the UE device 102 towards the desired appliance, or because accumulated errors in the sensors may result in an erroneous location or orientation for the UE device.

At step 310, UE device determines correspondences between the LoS and the multiple LoAs. For example, UE device 102 calculates all the angles between the LoS 340 and the LoAs. For example, as shown in FIG. 3C, UE device calculates angle 344 ($\phi_1$) (i.e., the angle between LoS 340 and LoA 342) and also angle 348 ($\phi_2$) (i.e., the angle between LoS 340 and LoA 346).

The UE device 102 compares angles 344 and 348 to a minimum threshold angle ($\delta$) 350. In one example, the minimum threshold angle may be bounded by an imaginary "cone of sight", as shown in FIG. 3C.

Based on the comparisons, if the UE device determines that, one of the calculated angles 344 and 348, is less than half of the minimum threshold angle 350, the UE device 102 then selects the corresponding LoA (i.e., either LoA 342 or LoA 346). The UE device 102 then further identifies the corresponding appliance (i.e., appliance 104-*a* or 104-*d*).

In one example, angle 350 is 20° (e.g., +/−10°), angle 344 is 5°, and angle 348 is 30°. In this example, because angle 348 is greater than angle 350, UE device 102 discards LoA 346, and does not identify appliance 104-*d* as a selected appliance.

On the other hand, angle 344 is less than angle 350. As such, UE 102 determines that the LoS 340 substantially corresponds to the LoA 342 and selects 104-*a* as the desired appliance to be controlled.

In one example, the minimum threshold angle may correspond to an error tolerance level within which a UE device may distinguish a single appliance from a group appliances. The minimum threshold angle may be defined based on calibration of an administrative UE device with respect to angular positions and spacings of the appliances 104. The minimum threshold angle may then be transmitted to the UE device 102, from the computer server 106, when the UE device 102 downloads the position information of the appliances 104. Alternatively, UE device 102 may perform a calibration by itself, with respect to the appliances 104, to determine the minimum threshold angle. An example calculation of the minimum threshold angle is provided with reference to FIG. 3E.

Figure 3E:
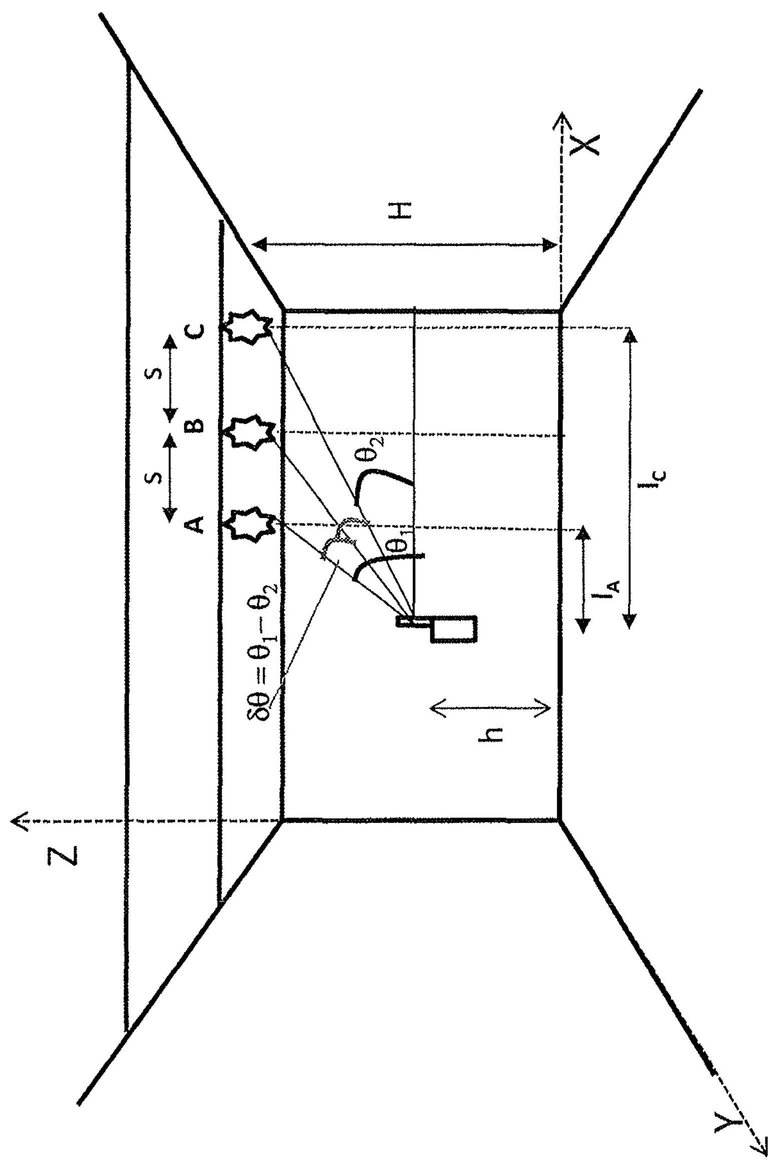
FIG. 3E is an exemplary diagram illustrating calculation of a minimum threshold angle used to facilitate identification of an example appliance.

As shown in FIG. 3E, UE device 102 may subtend angles $\theta_1$ and $\theta_2$ with the appliances A and C respectively and the difference between the two angles, namely the minimum threshold angle or the angle tolerance, is approximately, $(\theta_1-\theta_2)\approx d\theta$.

For example, assuming that the height of the appliances of interest is 'H' (i.e., distance between the floor and ceiling), an average height of the UE device 102 at the time of pointing (i.e. with user's hand extended towards the appliance, for example) is average spacing between the appliances is 's'. A trigonometric identity, $$\tan(\theta_1-\theta_2)=\frac{\tan(\theta_1)-\tan(\theta_2)}{1+\tan(\theta_1)\tan(\theta_2)},$$

is used to calculate $\delta\theta$.
Thus, $$(\theta_1-\theta_2)=\delta\theta=\tan^{-1}\left[\frac{\tan(\theta_1)-\tan(\theta_2)}{1+\tan(\theta_1)\tan(\theta_2)}\right] \tag{4}$$

With reference to FIG. 3E, $$\tan(\theta_1)=\frac{H-h}{l_A} \tag{5}$$

and tan $$\tan(\theta_2)=\frac{H-h}{l_C}. \tag{6}$$

Plugging Eq. (5) and Eq. (6) in Eq. (4), $$\delta\theta=\tan^{-1}\left[\frac{\frac{H-h}{l_A}-\frac{H-h}{l_C}}{1+\frac{H-h}{l_A}\cdot\frac{H-h}{l_C}}\right]=\tan^{-1}\left[\frac{(H-h)\cdot(l_C-l_A)}{l_A\cdot l_C+(H-h)^2}\right]. \tag{7}$$

Upon assuming that 'l' is the average linear distance from which the user could normally control an appliance, equation (7) is approximated as:

$$\delta\theta\approx\tan^{-1}\left[\frac{(H-h)\cdot s}{l^2+(H-h)^2+l\cdot s}\right]. \tag{8}$$

It is contemplated that, many appliances (e.g., lights) may be placed very close to each other in the indoor environment. As a result, more than one calculated angle (i.e., the angles between the LoS and the LoAs as calculated at step 310) may fall within the minimum threshold angle. In one implementation, the UE device 102 may select the appliance that corresponds to the smallest angle, from all the angles that fall within the threshold angle limit. In another implementation, the UE device may provide a list of all the appliances, to the user, corresponding to the angles that fall within the threshold angle. In this implementation, the list of the appliances may be presented to the user via an interface of the UE device. The user may then select one of the appliances using the user interface of the UE device 102. In yet another example, if the adjacent appliances are of the same type (e.g., adjacent lights on a ceiling) the system may select all of the appliances within the minimum threshold angle for control.

For example, as shown in FIG. 3D (similar to FIG. 3C), LoA 347 corresponds to appliance 104-*b* and subtends an angle 345, ($\phi_3$), with the LoS 340. In this example, angle 345 is 8°. As such, both the angles 345 and 344 fall within the minimum threshold angle 350 (i.e., 20°). The UE device 102 may select appliance 104-*a* over 104-*b*, because, LoA 342 (corresponding to appliance 104-*a*) is substantially closer to LoS 340 than the LoA 347 (corresponding to appliance 104-*b*).

Alternatively, the UE device 102 may present to the user, icons of both the appliances 104-*a* and 104-*b* on the display of the UE device 102. The UE device 102 may then provide the option to the user to select one of the devices as the desired appliance to be controlled.

In one exemplary embodiment, the UE device 102 may select a target appliance 104 based on a type of the appliance and/or based on a pre-selected choice. For example, the user of the UE device 104 may indicate that he or she wants to control an air-conditioner (instead of other appliances) during the initiation step 302 or during a setup (i.e., prior to the start of the identification of the appliances). The user may indicate the choice by pressing a button on the GUI associated with the appliance application.

In this embodiment, at step 310 the UE device 102 may identify multiple appliances (e.g., a light and an air-conditioner) that meet the minimum threshold angle criterion. However, the UE device may only display an icon of the air-conditioner on the display of the UE device, according to the pre-selected choice indicated by the user. It is contemplated that, the pre-selection of the type of appliance may considerably reduce time on part of the user to locate a target appliance.

Alternatively, in one example, the computer sever 106 may report back to the UE device 102 that none of the appliances 104 is operational and/or has provision or permission to be controlled (e.g., upon a determination performed at step 306). At step 312, the UE device may then provide a notification to the user (on the GUI of the UE device 102), that no appliances are found that can be controlled, and the UE device 102 may close down the application, e.g., the GUI at step 318.

It is further contemplated that UE device 102 may be configured to calculate and compare the distances of the multiple appliances 104 from the UE device, in addition to the angle calculations, during the selection of the appliances. For example, the UE device may compute the distances (since coordinates of the appliances and UE devices are available) of the appliances. The UE device may also process RSSI values in order to estimate a range of the appliances from the UE device. In one example, a first appliance that may be closer to the UE device 102, may be selected over a second appliance that is further from the UE device 102. Both the first and second appliances, however, may extend the same LoA angles with the LoS of the UE device.

It is contemplated that, in one implementation, the computational load related to the identification and selection of the appliance may be shared between the UE device 102 and the computer server 106. In this implementation, the UE device 102 may transmit its current location and LoS to the computer server 106. Upon receiving the LoS and location information of the UE device 102 and using the database of the appliances 104 (already stored in the computer server 106), the computer server 106 may calculate the LoAs. The computer server 106 may further identify the appliance that is closest to the LoS of the UE device 102. Alternatively, the UE device may provide partial information (e.g., LoAs of the appliances) and the computer server may further process the partial information to select the appliance that is closest to the UE device 102. This may reduce the computational load of the UE device 102. It is noted that, by utilizing a central control computer which is directly interfaced with all the appliances either in a wired or wireless fashion or both, the user can control, access and obtain information about all the appliances or objects even when these appliances may not be capable of any wireless communication or may not have a compatible wireless communication ability. This may help reduce cost of installation and maintenance of appliances since it may be more economical to control simple devices such as lights with only on/off control through a centralized control computer or server rather than equipping all of them with compatible wireless technologies. It may be further noted that, in use case scenarios, for instance in a large shopping mall, where the user is a customer who wishes to only access information about an object or merchandise, and not control such an object, the object is not required to be interfaced with the central control computer, nor does it need to be tagged with bar code, QR code etc. In such situations, the central control computer, simply by virtue of knowing the object's 3-D position coordinates, may utilize the LoS information received from the UE device, to identify the objects or merchandise of interest and present the desired information to the user.

In another embodiment the central control computer or another appliance may utilize the LoS information to direct another device. For instance user may use the UE device to point a laser beam towards a presentation screen by communicating with a projector. In such a case, the UE device may be pointed towards the projection surface at a desired point of interest and the resulting LoS may be communicated to the projector equipped with gimbal mounted laser pointer beam to direct the beam to the aforementioned desired spot on the projection surface.

In yet another embodiment, the UE device 102 may estimate an angle of arrival (AoA) to identify and communicate with one of the appliances. In this embodiment, the appliances 104 may be BLE-enabled and transmit signals that may be received by the UE device 102. The appliances 104 may be in transmit-only mode. The UE device 102, upon arrival near a target appliance, may initiate a scan of BLE signals, and may estimate an AoA for all the signals arriving at its RF interfaces. For example, the UE device 102 may calculate the AoA by processing the BLE signals transmitted from the appliances 104. The BLE signals may indicate presence of the appliances.

In one example, the UE device 102 may consult the map of the indoor environment 100, the estimated AoA, and the database of location information for the appliances to identify the target appliance 104. In addition, the UE device 102 may estimate distance between the target appliance 104 and the UE device, for example, upon processing RSSI values received in the signal, to improve the identification of the appliance 104.

In another example, the UE device 102, may calculate an AoA to determine its current location in the indoor environment 100. In this example, respective AoAs of the UE device 102 may be calculated for each of the RF signal sources 108 by processing the RF signals received from the signal sources. In addition, the UE device 102 may further process the RF signals (e.g., RSSI measures) to estimate distances from the RF signal sources. Based on the received location information of the RF signal sources 108, the estimated distances and the AoA, the UE device 102 may determine its position and orientation in the indoor environment 100 using triangulation. Next, the UE device 102 may calculate the LoS and LoAs to identify a target appliance 104.

It is contemplated, that the UE device 102 may be configured to calculate angle of arrival (AoA) with respect to other communication devices (e.g., appliances or RF signal sources). In order to perform such calculations, UE device 102 may include receiver having multiple antennas as described in FIG. 4A. The AoA may be detected, for example, by measuring phase differences in the signals recorded at the various antennas. It is contemplated that, in one example, when the UE device is used for pointing at an appliance of interest, the user may typically hold one end of the UE device within his/her palm grip. As a result, the user may partially or completely be occluding the antennas mounted on that end of the device from signals, while exposing the antennas mounted on the other end (of the UE device) to RF signals. This may help the UE device to narrow down the appliances (that are being pointed at) and identify the signals that closely matches its own alignment.

Referring back to FIG. 3A, once the appliance or object (e.g., appliance 104-*a*) is uniquely identified and selected for control, at step 314, the UE device 102 retrieves identification information of the appliance 104-*a*. It is contemplated that, the appliances 104 may be Internet of Things (IoT) appliances. In some implementations, the IoT appliance 104-*a* (e.g., an upgraded IoT wireless microwave or a stove) may not be configured to have an interface for human interaction (e.g., keyboards and touchscreens) and may rely on UE devices to be configured and controlled.

Figure 7:
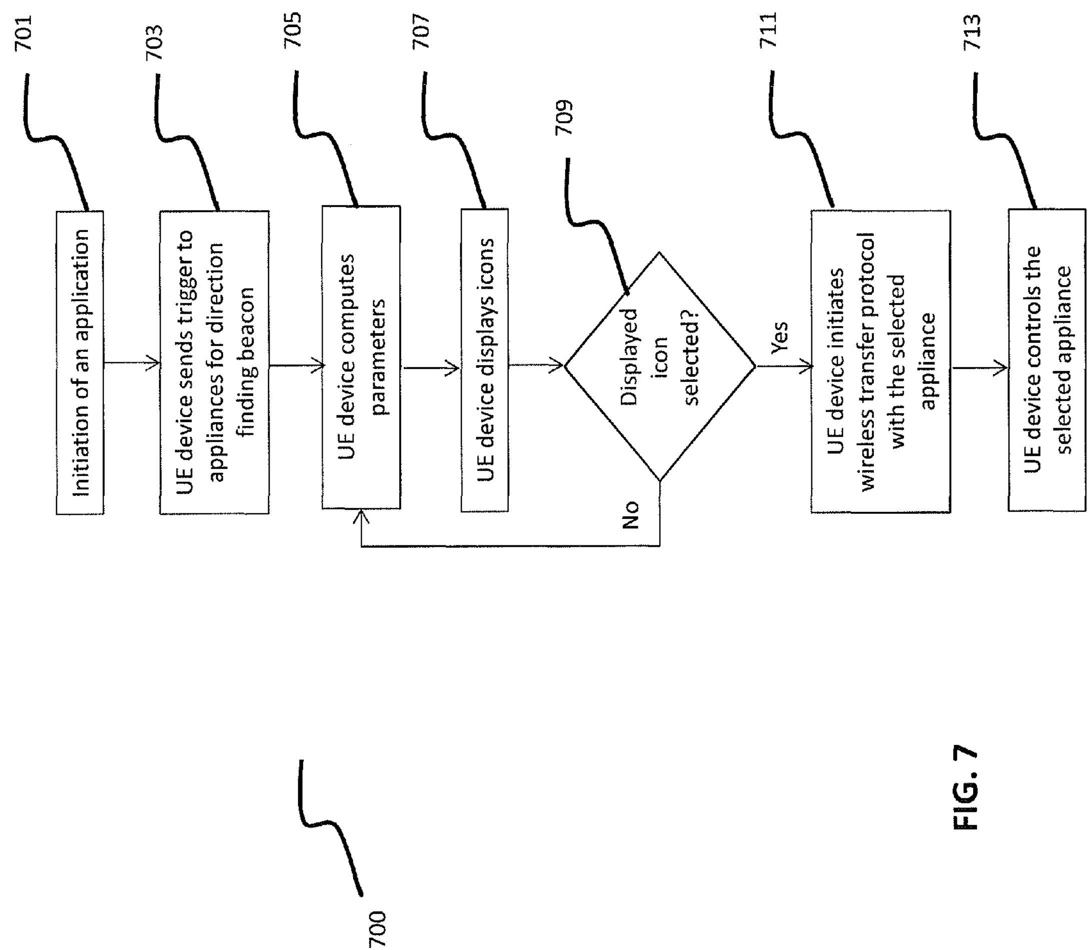
FIG. 7 is a flow chart diagram of an example process executed by a UE device to identify and control an appliance in the example environment of FIG. 1 according to one or more implementations described herein.

Reference is now made to FIG. 7 that describes an exemplary method 700 for identifying and controlling one of the example appliances 104 in the indoor environment 100. At step 701, the user of the UE device 102 may point at the appliances 104 and execute an application to initiate identification and communication with one of the appliances 104. In one example, the application may be downloaded by the UE device 102 from the computer server 106 upon entering the indoor environment 100. In one implementation, the downloaded application is an AllJoyn® application that allows devices (e.g., UE device 102) to advertise and share their abilities with other devices (e.g., appliances 104) that are in range. In such implementations, at step 703, the UE device 102 may transmit a device ID, such as a universally unique identifier (UUID). As described above, the transmitted device ID may trigger IoT appliances 104 to send direction finding beacons to the UE device 102. Typically, the UUID is a 128-bit value that is used for device identification by Bluetooth enabled devices. In another example, the appliance may send a Wi-Fi media access layer (MAC) ID to identify itself. Upon receiving the UUID or the Wi-Fi MAC address, the UE device may consult the computer server 106 to determine the identification of the appliance 104. Alternatively, the appliance 104-*a* may receive a UUID or MAC ID from the UE device and then determine the identification of the UE device 102 based on information stored in the memory of the appliance 104 or accessible to the appliance 104 from a central database. At step 705, upon receiving the direction finding beacons from the appliances 104, the UE device 102 may compute parameters, for example, time delay measurements (as described in detail with reference to FIG. 3A) for each of the appliances 104. Based on the computation, the UE device determines which of the appliances 104 the UE device 102 is pointing at. At step 707, a display of the UE device 102 displays an icon of one of the appliance 104 (e.g., the appliance the user is pointing at). At step 709, UE device 102, determines whether the user has selected the displayed icon of the appliance 104. When the user selects the displayed, the method proceeds to step 711. However, in one example, the appliance corresponding to the displayed icon may not be the one that the user wishes to control (as described in detail with respect to FIGS. 3C and 3D). As such, the user may provide instruction (e.g., by pressing a go-back button on the downloaded application) to the UE device 102 to determine identification of another appliance 104. As such, the method then goes back to step 705. At step 711, upon the selection of the icon of the appliance 104 at step 709, the UE device 102 executes wireless protocol, such as Bluetooth Object Exchange (OBEX), to facilitate downloading of the UI of the selected appliance 104. In one example, the UI may include IoT control parameters of the appliances 104. At step 713, the UE device controls the selected IoT appliance 104 using the downloaded control parameters (as described in detail with respect to step 316 of FIG. 3A).

Referring to FIG. 3A, in one example, both the appliance 104-*a* and the UE device 102 may be Bluetooth technology compliant. In this example, the UE device 102 retrieves a Bluetooth address of the identified appliance from the stored database (received from the computer server 106). The database includes connectable identification (e.g., Bluetooth address, pairing information etc.) for the appliance 104-*a*. The retrieving of the address may include locating the connectable identification information of the appliance corresponding to its physical position information (i.e., the coordinates of the appliance 104-*a*). For example, the database may include information of the appliances as tuples: "<position information, connectable id, appliance type, appliance attributes>".

Once the address is retrieved, the UE device may establish a radio communication link, for example, a Bluetooth communication link, with the appliance 104-*a*. It is contemplated that, other wireless technologies may be used to establish radio communication between the UE device and the appliance 104-*a* (i.e., the identified appliance), provided that both the UE device and the identified appliance are compliant with the wireless technology.

Figure 6:
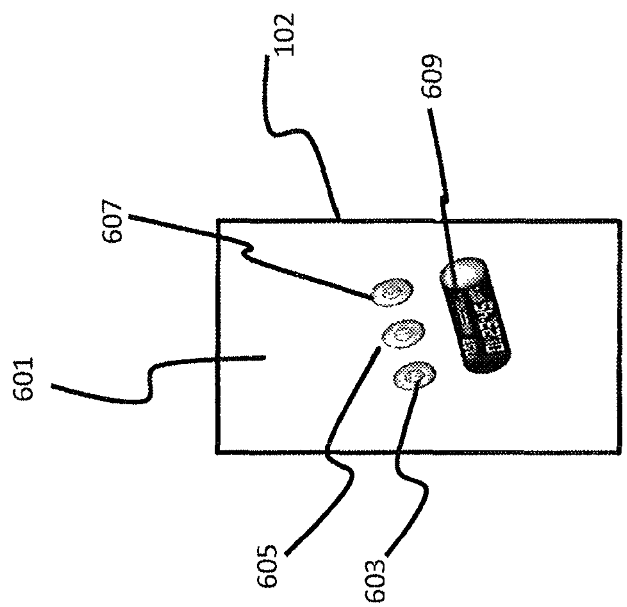
FIG. 6 is a diagram illustrating an exemplary user interface (UI) downloaded by an exemplary UE device.

At step 316, the user of the UE device 102 may execute instructions to control the appliance 104-*a*. For example, control of the appliance 104-*a* may include turn on/turn off commands, changing brightness of a light or temperature of an air-conditioner. In one implementation, the appliance 104-*a* may have special features, such as a timer, that may be set to make the appliance operable only at specific times. Such features may be presented to the user of the UE device 102, on additional GUIs in the UE device 102. Moreover, the user may need to provide additional authentication information to access the special features. As shown in FIG. 6, the UE device 102 may download UI 601 that is associated with a wireless microwave (not shown). The download UI 601 may be displayed on the UE device 102. The UI 601 may include menu buttons such as, an on/off button 603, a timer button 605, a food selection button 607, and a display button 609. In one implementation, the UE device 102 may establish peer to peer (P2P) communication with the wireless microwave, and a user of the UE device 102 may control the microwave wirelessly using the buttons 603-609.

In one implementation, the user of the UE device 102, may not be familiar with the appliance 104-*a*. In such a scenario, the user may request an operation manual or control menu of the appliance via the application, or tips on how to control the appliance. Upon downloading the operation manual, the user of the UE device 102 may start controlling the appliance.

At step 318, upon completion of the control of the appliance, the user may close the user interface on the UE device 102 and disconnect the wireless link to save power. For example, upon receiving instructions to close the user interface, the UE device 102 may prompt the user to verify the shutdown of the program. This may avoid any accidental closing of the appliance control application on the UE device 102.

The present disclosure is described in terms of appliances that include short-range transmitters (e.g. Bluetooth® BLE transmitters) whose signals are captured by UE devices, such as a mobile telephone that includes a Bluetooth transceiver. It is contemplated, however, that other types of transmitter and receivers can be used, for example infrared, ultrasonic, or near-field communications (NFC). In addition, as described below, it is contemplated that the appliances may include RF transceivers that do not broadcast signals but, instead, sense signals broadcast by the UE device. In such a scenario, the appliances may be associated with other appliances in a MESH network (e.g., ZigBee network based on IEEE 802.15).

Figure 4B:
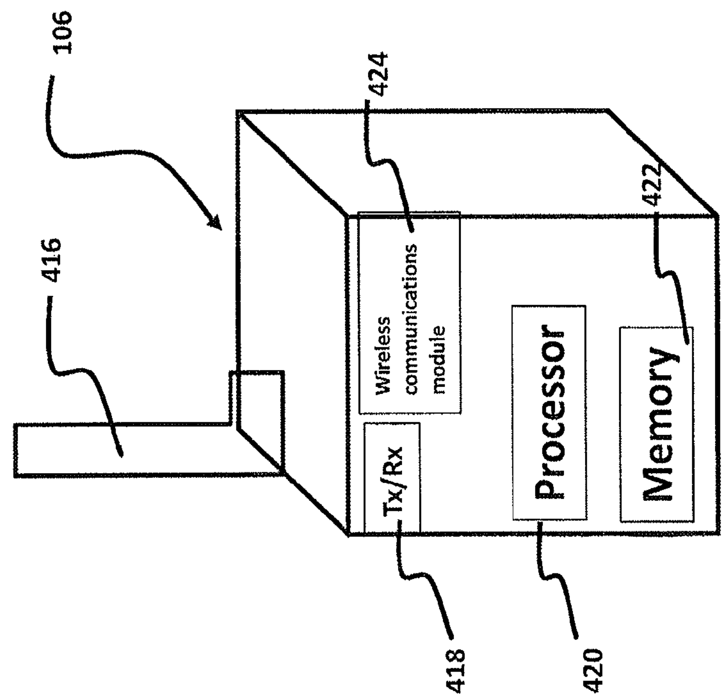
FIG. 4B is a diagram illustrating an exemplary computer server.
Figure 4A:
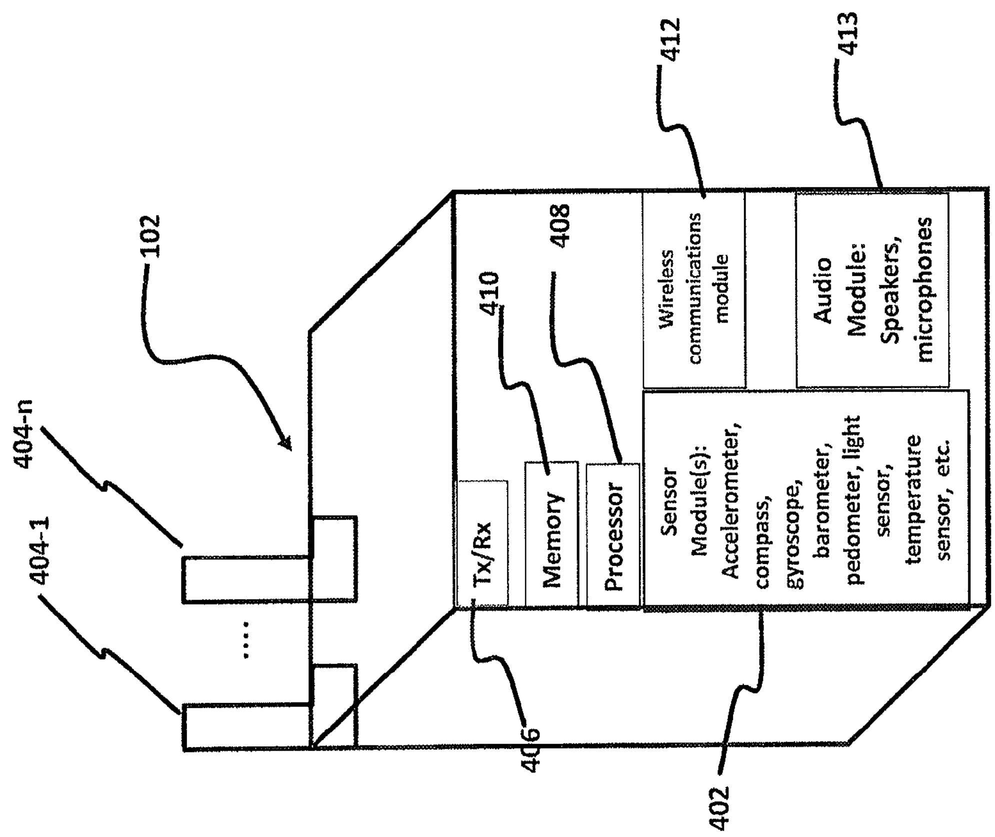
FIG. 4A is a diagram depicting one embodiment of a UE device.

FIG. 4A is a block diagram of an example UE device 102. The UE device, which may, for example, be a conventional smart phone, includes one or more receiver and/or transmitter 406, a wireless (e.g., cellular/WLAN/mesh/Bluetooth/BLE) communications module 412, a memory 410, a sensor module 402, a processor 408 and one or more antennas 404.

In one example, the UE device 102 may be a smart phone that includes an application for communicating with the appliances 104. In that example, the receiver 406 senses the low-power signals broadcast by the appliances 104 via one of the antennas 404. The processor 408 may process the signals sensed by the receiver in order to determine the characteristics of the signals and further store these characteristics into the memory 410.

In one example, the memory 410 may store an indoor map of the indoor environment 100, and a database related to the appliances. The database, stored in the memory 410, may include information about the location, identification and the type of appliances in the form of "<appliance, location, id, type>".

Moreover, the signal characteristics, received either from the RF signal sources or the appliances, may be further processed by the processor 408 to determine the proximity level of the UE device 102, an angle of arrival (AoA), and/or an angle of departure (AoD) with respect to the RF signal sources 108 or appliances 104.

In one example, the UE device 102 may not process the signal characteristics. In this example, the UE device 102 may transmit the signal characteristics to the computer server 106 via the cellular/WLAN/mesh communications module 412. The module 412, which may include, for example, one or more of an 802.11 Wi-Fi transceiver, a cellular transceiver, a IEEE 802.14 Zigbee® transceiver or a Bluetooth transceiver, may communicate with server 106, for example, to determine the proximity, AoA, AoD of the UE device.

Communication between the UE device and server may be implemented using the communication module 412, for example using a Wi-Fi network, or alternatively, using the short-range communications module 406.

The example UE device 102 may calculate displacement, acceleration, altitude, environmental information based on its present and/or previous location along a path in the indoor environment. This information may be generated by sensor module 402 that may include, without limitation, a Hall-effect or micro electro-mechanical systems (MEMS) magnetometer, compass, a MEMS accelerometer, an optical or MEMS gyroscope, a pedometer, and a MEMS barometer. The sensed information may be processed locally by the processor 408 or it may be sent to the server 106 for determining a position of the UE device 102 in the indoor environment 100. In one example, the sensor module of the UE device 102 may also include a camera (not shown) or bar-code scanner (not shown) that a user may employ to scan barcodes or QR codes of the appliances 104 to retrieve information related to the appliances. In addition, the UE device 102 may include an audio module 413 that includes multiple speakers and microphones. The audio module 413 may be coupled to the processor 408. The audio module may also include voice synthesis and voice recognition modules to implement an audio interface. In one example, the UE device 102 may also be equipped with a temperature sensor and/or a light sensor to measure ambient temperature and light respectively. The sensed signals may be further processed (either by the UE device or the computer server) to determine types of appliances and utilized to control appliances. For instance, in some implementations, the central control computer server 106 may periodically receive from the UE device information such as the instant position coordinates of the UE device at a particular location, and the sensed signals (e.g., the ambient light and temperature at the particular location of the UE device). Upon receiving such information, the computer sever 106, may automatically turn on/off, increase/decrease intensity of light appliances, adjust air conditioners' settings, and further update such settings of the appliances as the user moves around the building interior. In one example, the computer server may measure the received sensed signals and compare the signals with an optimal signal (stored in the memory of the computer server). The setting and control of the appliance may then be performed based on the optimal signal. It is contemplated that, such operations performed by the computer server 106, may make installation of proximity sensor based on ambient light controls redundant, which may further lead to reduction in both installation as well as operational costs.

Example UE device 102 may estimate the angle of arrival (AoA) and/or (AoD) of communication signals received from appliances 104 or RF signal sources 108. For example, estimation may include the processor 408 sampling and recording amplitude and phase measurements of the signal received by each antenna in the antenna array (404-1 . . . **404-*n*) strategically installed on the UE device. A RF switch (not shown) may be implemented to cycle through each antenna of the array to facilitate the recording of the measurements. Multiple transceivers 406 may be implemented to estimate the angles based on the recorded samples and antenna array parameters. The antenna parameters may include information related to configuration and position of antennas within the antenna array 404**.

FIG. 4B is a block diagram of an exemplary embodiment of server 106. The example server 106 includes a processor 420, memory 422, a wireless (e.g. Cellular/WLAN/mesh/Bluetooth/BLE) communication module 424 and antennas 416. The example server 106 is configured to communicate with the UE device 102 using the cellular/WLAN/mesh/Bluetooth/BLE communication module 424. In one example, the server 106 may receive location information or ID of appliances using the cellular/WLAN/mesh/Bluetooth/BLE communication module 424, from the UE device 102, and the processor 420 may process the received information to determine an association of the appliance ID and/or location with an appliance or a type of appliance 104. The determination may be based on an indoor map, and/or database which may be stored in the memory 422. The cellular/WLAN/mesh/Bluetooth/BLE communication module 424 may also send the stored data to a requesting UE device 102.

In another example, the server 106 may also be configured to communicate with the appliances 104 via the communication module 424, for example, which may use one or more antennas 416 to communicate with the UE devices 102, the appliances 106 and RF signal sources 108.

Figure 4C:
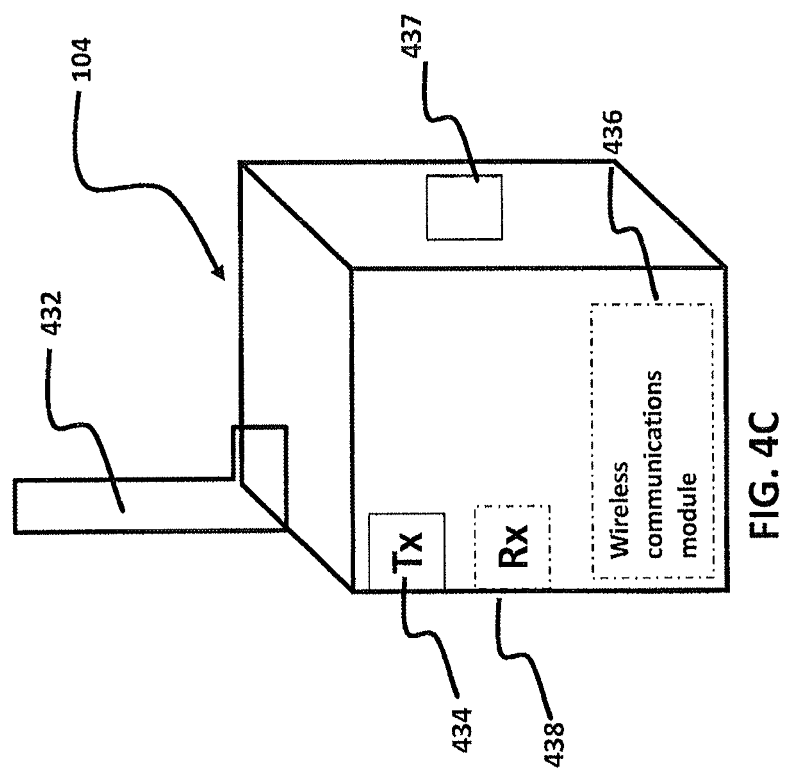
FIG. 4C is a diagram depicting one embodiment of an appliance controller.

FIG. 4C is a block diagram of an appliance controller 105 of an example appliance 104 that is suitable for use with the example embodiments. The appliance controller 105 may be connected to the appliance via connector 437. In one example, the connector 437 is a USB connector that may suitably connect to any of the appliances 104. In another example, the connector 437 may be a mechanical switch (e.g. relay) or semiconductor switch (e.g., triac) coupled between the appliance and its power source. In the examples provided, one skilled in the art would understand that, any communication (e.g., with the UE device 102 or server 106) that is either originating or, terminating at the appliance 104, is via the appliance controller 105. The appliance controller 105 includes a transmitter 434, antennas 432, a receiver 438 and an optional wireless (e.g., cellular WLAN/mesh/Bluetooth/BLE) communication module 436. The antenna may be used for both the transmitter 434 and WLAN/mesh communications module 436 or separate antennas may be used. In one exemplary embodiment, the transmitter 434 is a Bluetooth low energy (BLE) transmitter. Appliance controller 105 may periodically send signals and the UE device may sense the BLE signals. It is contemplated, however, that the appliance controller 105 may communicate with the UE device 102 and/or the central server 106 via various other technologies, such as infrared, ultrasonic and NFC that are compliant with the UE device and the appliances. Appliances 104 may be connected to an electrical network of the indoor environment 100 and may be interfaced/wired to the central server 106.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A method for controlling appliances using a user equipment (UE) device, the method comprising:

determining a first position of the UE device within an environment;

determining an orientation of the UE device based on at least one attitude sensor;

calculating a line of sight (LoS) from the UE device based on the determined first position of the UE device and on the determined orientation of the UE device;

calculating lines of association (LoA) between the determined first position of the UE device and locations of the appliances, each LoA being between the determined first position of the UE device and the location of the corresponding appliance;

selecting one of the appliances based on the LoS and the calculated LoAs; and configuring the UE device to control the selected appliance.

2. The method of claim 1, wherein the selecting one of the appliances includes:

calculating angles between the LoS and the LoAs;

determining the smallest of the calculated angles; and selecting the appliance associated with the smallest of the calculated angles.

3. The method of claim 2, wherein selecting the appliance associated with the smallest of the calculated angles is conditioned on the smallest of the calculated angles being less than a threshold.

4. The method of claim 3, wherein the threshold is based on spacings between the appliances, the first position, and a height of a user operating the UE device.

5. The method of claim 1, further comprising, the UE device receiving the locations of the appliances, from a server, and wherein the UE device calculates the LoS, calculates the LoAs, and selects one of the appliances.

6. The method of claim 5, further including sending, by the UE device, authentication information to the server prior to the receiving of the locations of the appliances.

7. The method of claim 1, further including transmitting instructions from the UE device to control the selected appliance.

8. The method of claim 1, wherein the first position of the UE device and the orientation of the UE device are based on a coordinate system that is selected from the group consisting of: (a) a Cartesian coordinate system, (b) a cylindrical coordinate system, and (c) a spherical coordinate system.

9. The method of claim 1, further including updating the first position of the UE device to a second position and updating the LoS of the UE device according to the second position, wherein the updating to the second position is based on dead-reckoning or triangulation using sensors internal to the UE device, or trilateration using RF signals from RF signal sources positioned at various locations in the environment.

10. The method of claim 1, wherein configuring the UE device to control the selected appliance includes retrieving connectivity information of the selected appliance.

11. The method of claim 10, wherein configuring the UE device to control the selected appliance further includes establishing a wireless communication link between the selected appliance and the UE device using the connectivity information.

12. The method of claim 1, wherein configuring the UE device to control the selected appliance includes receiving information indicating a type of the selected appliance, and at least one operational instruction for the selected appliance.

13. The method of claim 1, wherein the selecting one of the appliances includes at least one of a) determining distances between the UE device and the appliances or b) determining an angles of arrival of signals received by the UE device from the appliances.

14. The method of claim 1, wherein the configuring of the UE device to control the selected appliance includes downloading an appliance control interface associated with the selected appliance.

15. The method of claim 14, wherein the appliance control interface includes a voice command interface to configure the UE device to receive audio menu selections and process voice commands for the selected appliance.

16. The method of claim 1, wherein a server calculates the LoS, calculates the LoAs, and selects one of the appliances.

17. A method for controlling an appliance using a user equipment (UE) device, the method comprising:

receiving from a server, by the user equipment (UE) device, positional information of an environment including a first reference frame that is associated with the environment; and receiving location information of a plurality of appliances positioned at respective locations within the environment;

determining, by the UE device, a first position of the UE device within the environment, based on the received first reference frame and determining an orientation of the UE device;

calculating, by the UE device, a line of sight (LoS) based on the determined first position and the orientation of the UE device;

calculating multiple lines of association (LoA) for multiple appliances of the plurality of appliances within a predetermined range of the UE device, each LoA being between the determined first position of the UE device and the location of the corresponding appliance;

determining correspondences between the LoS and each of the multiple LoAs;

identifying a subset of the plurality of appliances whose associated LoAs substantially correspond to the LoS, displaying, in the UE device, respective icons corresponding to each of the appliances in the subset of appliances;

receiving a selection of one of the displayed icons;

configuring the UE device to control the appliance corresponding to the selected icon.

18. The method of claim 17, wherein determining the correspondences between the LoS and the multiple LoAs includes calculating angles between the LoS and each of the multiple LoAs.

19. The method of claim 18, wherein an appliance is included in the subset appliances when the calculated angle between the LoAs and the LoS associated with that appliance is less than a threshold angle.

20. The method of claim 17, wherein configuring the UE device to control the appliance corresponding to the selected icon includes receiving information of a type of the appliance corresponding to the selected icon.

21. An apparatus, comprising:

a transceiver configured to:

receive positional information of an environment including a first reference frame associated with the environment;

receive location information for a plurality of appliances positioned within the environment;

at least one attitude sensor; and a processor coupled to the transceiver and the at least one attitude sensor and configured to:

determine a position of the apparatus within the environment, based on the received first reference frame;

determine, based on signals from the at least one attitude sensor, an orientation of the apparatus;

calculate a line of sight (LoS) based on the determined first position and the orientation of the apparatus;

calculate multiple lines of association (LoA) for multiple appliances of the plurality of appliances, each LoA being between the determined position of the apparatus and the location of the corresponding appliance;

determine correspondences between the LoS and the multiple LoAs; and identify an appliance of the multiple appliances having the LoA that most closely corresponds to the LoS;

configure the apparatus to control the identified appliance.

22. A method for controlling an appliance, the method comprising:

receiving, by a server, from a user equipment (UE) device within an environment, a first position of the UE device, the first position being based on a first reference frame associated with the environment;

receiving, by the server from the UE device, an orientation of the UE device;

calculating a line of sight (LoS) of the UE device based on the first position and on the orientation of the UE device;

calculating a line of association (LoA) for an appliance between the received first position of the UE device and the location of the appliance;

determining a correspondence between the LoS and the LoA; and determining whether the LoA substantially corresponds to the LoS; and controlling, by the server, in the case that the LoA substantially corresponds to the LoS, the appliance based on communications with the UE device.

23. The method of claim 22, wherein the determining whether the LoA substantially corresponds to the LoS includes: calculating an angle between the LoA and the LoS, and determining whether the calculated angle is less than a threshold.

24. The method of claim 22, wherein the communications with the UE device include sending, to the UE device, a graphical user interface (GUI) associated with the appliance for use in controlling the appliance.

25. The method of claim 24, further including, receiving, from the UE device, control parameters associated with the GUI, in response to the sending of the GUI.

26. The method of claim 25, wherein controlling the appliance is according to the received control parameters from the UE device, and includes establishing a communication link with the appliance.

27. A method for supplying information about objects to a user equipment (UE) device, the method comprising:

determining a first position of the UE device, the first position being based on a first reference frame associated with the environment;

determining an orientation of the UE device;

determining a line of sight (LoS) from the UE device based on the first position of the UE device and on the orientation of the UE device;

calculating lines of association (LoA) between the first position of the UE device locations of objects in the environment, each LoA being between the determined first position of the UE device and the location of the corresponding object;

selecting one of the objects based on the LoS and the LoAs; and sending information about the selected object to the UE device.

28. The method of claim 27, wherein the objects are merchandise placed on shelves of a store or artifacts of a museum.

29. A method for controlling an appliance using a user equipment (UE) device, the method comprising:

receiving, by a user equipment (UE) device from a server, positional information of an environment including a first reference frame that is associated with the environment;

receiving location information of a plurality of appliances positioned at locations within the environment;

determining, by the UE device, a first position of the UE device within the environment, based on the received first reference frame;

determining an orientation of the UE device;

calculating, by the UE device, a line of sight (LoS) based on the determined first position and the orientation of the UE device;

receiving, by the UE device, direction finding beacons from the plurality of appliances;

calculating, by the UE device, multiple angle of arrival (AoA) parameters based on the received direction finding beacons;

identifying a subset of the plurality of appliances associated with AoA parameters that substantially correspond to the LoS;

displaying, in the UE device, icons corresponding to each of the appliances in the subset of appliances;

receiving a selection of one of the displayed icons;

configuring the UE device to control the appliance corresponding to the selected icon.

30. The method of claim 29, wherein the identifying the subset of the plurality of appliances includes calculating angles between the LoS and the AoA parameters, and identifying the calculated angles that are less than a threshold.

31. The method of claim 29, wherein the receiving the direction finding beacons includes receiving at least one of the direction finding beacons at multiple antennas of the UE device at different arrival times.

32. The method of claim 29, wherein the configuring the UE device further includes downloading a control user interface (UI) of the selected appliance and controlling the selected appliance according to the control UI.

* * * * *